United States Patent
Ikuta

(10) Patent No.: US 11,178,291 B2
(45) Date of Patent: Nov. 16, 2021

(54) ELECTRONIC ALBUM APPARATUS, AND OPERATION METHOD AND OPERATION PROGRAM FOR THE SAME

(71) Applicant: FUJIFILM Corporation, Tokyo (JP)

(72) Inventor: Mayuko Ikuta, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/986,480

(22) Filed: Aug. 6, 2020

(65) Prior Publication Data

US 2020/0366798 A1 Nov. 19, 2020

Related U.S. Application Data

(63) Continuation of application No. PCT/JP2019/001484, filed on Jan. 18, 2019.

(30) Foreign Application Priority Data

Feb. 8, 2018 (JP) .............................. JP2018-020905

(51) Int. Cl.
  *H04N 1/08* (2006.01)
  *G06F 3/12* (2006.01)
  (Continued)

(52) U.S. Cl.
  CPC ......... *H04N 1/00196* (2013.01); *G06F 3/017* (2013.01); *G06F 3/048* (2013.01); *H04N 1/00167* (2013.01); *H04N 1/00177* (2013.01)

(58) Field of Classification Search
  CPC . H04N 1/00196; H04N 1/00167; G06F 3/017
  See application file for complete search history.

(56) References Cited

U.S. PATENT DOCUMENTS

| | | | |
|---|---|---|---|
| 2012/0072870 A1* | 3/2012 | Akifusa | G06F 3/0482 715/830 |
| 2015/0095827 A1* | 4/2015 | Yamamoto | G06F 16/583 715/770 |

(Continued)

FOREIGN PATENT DOCUMENTS

| | | |
|---|---|---|
| JP | 2014-191701 A | 10/2014 |
| JP | 5655112 B2 | 1/2015 |
| JP | 2017-117479 A | 6/2017 |

OTHER PUBLICATIONS

International Search Report issued in PCT/JP2019/001484; dated Apr. 9, 2019.

(Continued)

Primary Examiner — Ibrahim Siddo
(74) Attorney, Agent, or Firm — Studebaker & Brackett PC

(57) ABSTRACT

An instruction receiving unit receives a return instruction to return a deleted image IMD deleted from an album page to the album page. A return processing unit executes a return process of returning the deleted image IMD to the album page in response to the return instruction. An extracting unit executes an extraction process of extracting, from among a plurality of deleted images IMD, an identical-attribute image IMS which is a deleted image IMD whose attribute is identical to an attribute of an image IM present in the album page at a current position of scroll display. A list display processing unit executes a list display process of displaying, together with the album page, a list of identical-attribute images IMS.

13 Claims, 36 Drawing Sheets

(51) Int. Cl.
  *H04N 1/00*  (2006.01)
  *G06F 3/01*  (2006.01)
  *G06F 3/048* (2013.01)

(56) References Cited

U.S. PATENT DOCUMENTS

2016/0019416 A1   1/2016  Noguchi
2018/0181281 A1*  6/2018  Suki ..................... G09B 29/10

OTHER PUBLICATIONS

Written Opinion issued in PCT/JP2019/001484; dated Apr. 9, 2019.
An Office Action; "Notice of Reasons for Refusal," mailed by the Japanese Patent Office dated Aug. 31, 2021, which corresponds to Japanese Patent Application No. 2019-570645 and is related to U.S. Appl. No. 16/986,480 with with English translation.

* cited by examiner

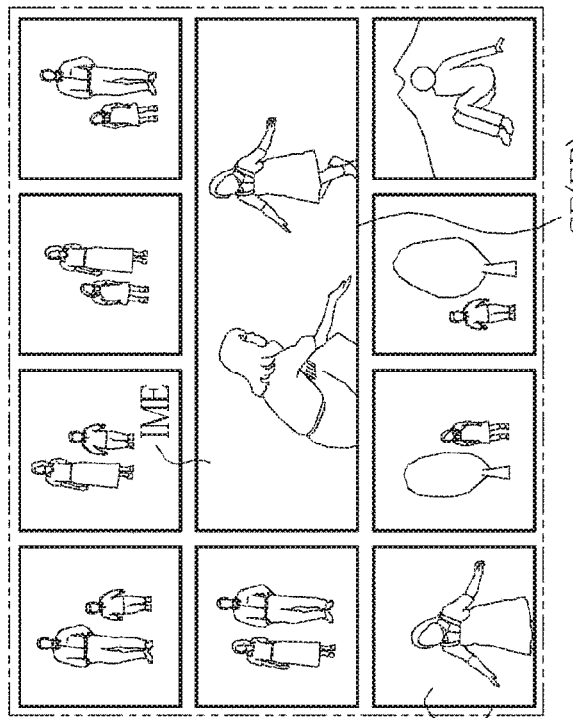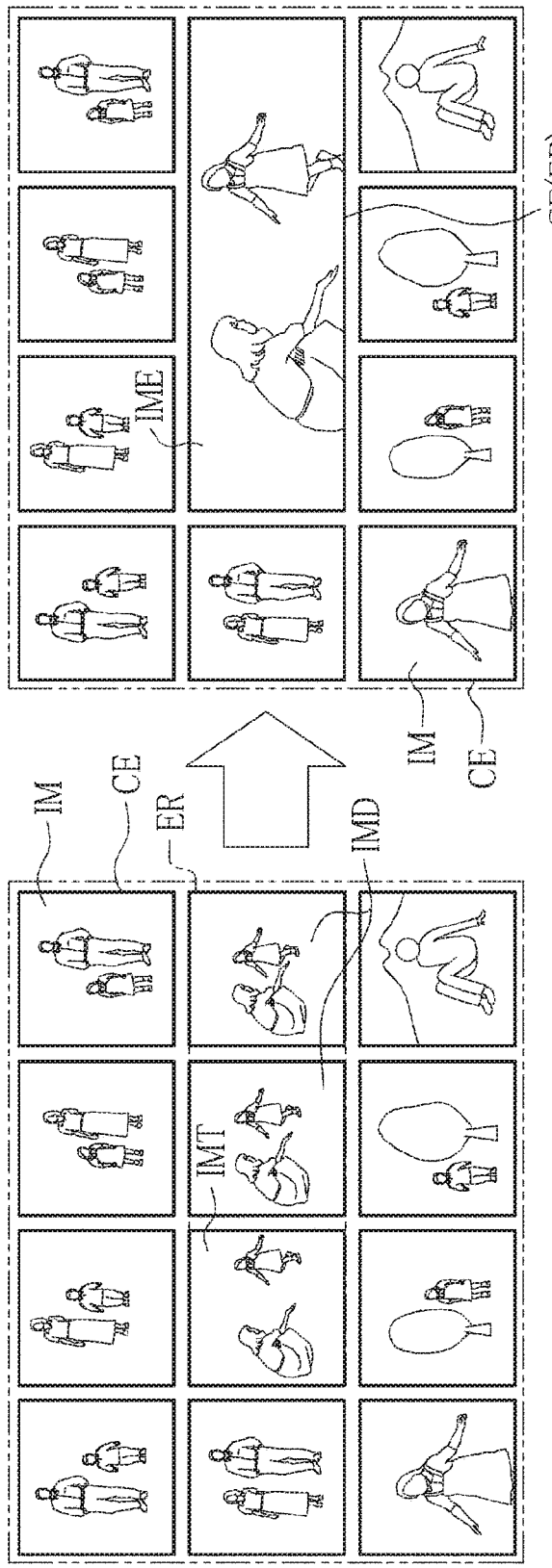

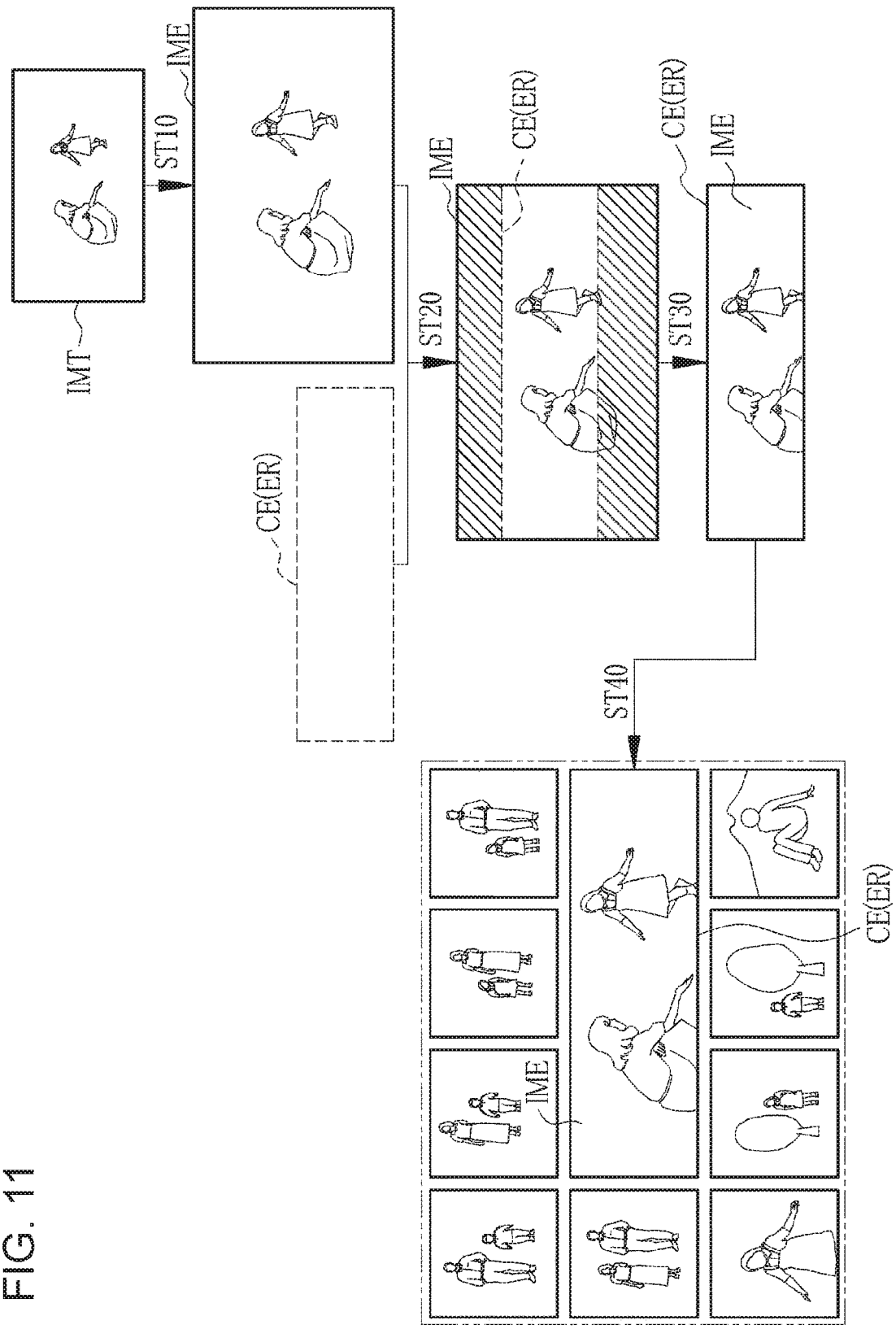

FIG. 14

| IMAGES DISPLAYED ON ALBUM PAGE ~31 ||
|---|---|
| IMAGE ID | LAYOUT INFORMATION (ADDRESS INFORMATION OR THE LIKE) |
| IM001 | CE11 ··· |
| IM002 | CE12 ··· |
| IM003 | CE13 ··· |
| IM009 | CE31 ··· |
| IM010 | CE32, CE33, CE34 ··· |
| IM013 | CE41 ··· |
| IM014 | CE42 ··· |

| DELETED IMAGES |
|---|
| IM011 |
| IM012 |
| IM050 |

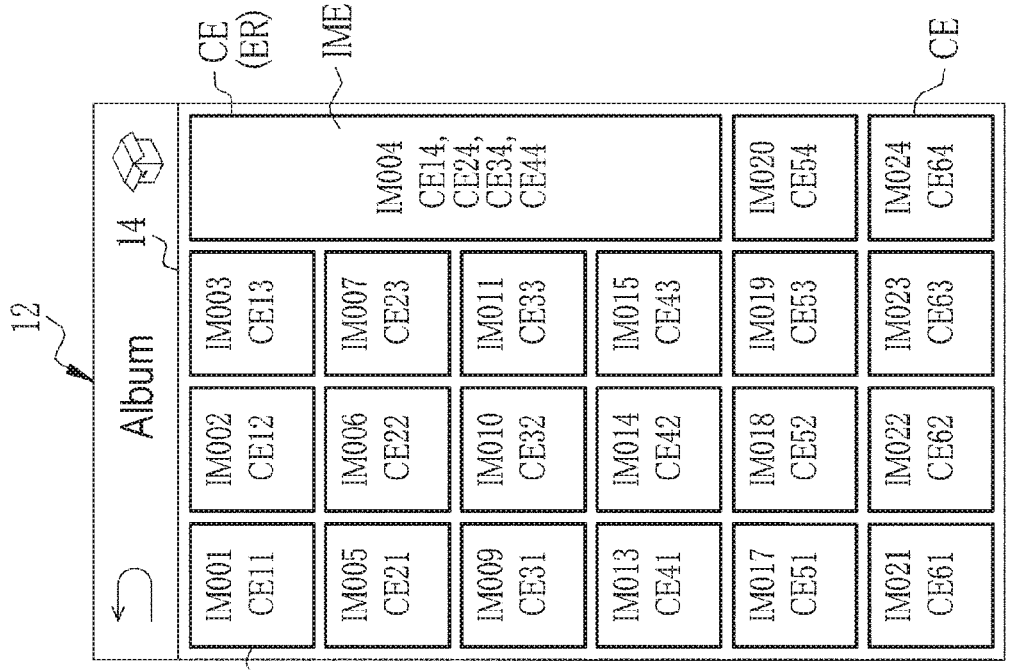
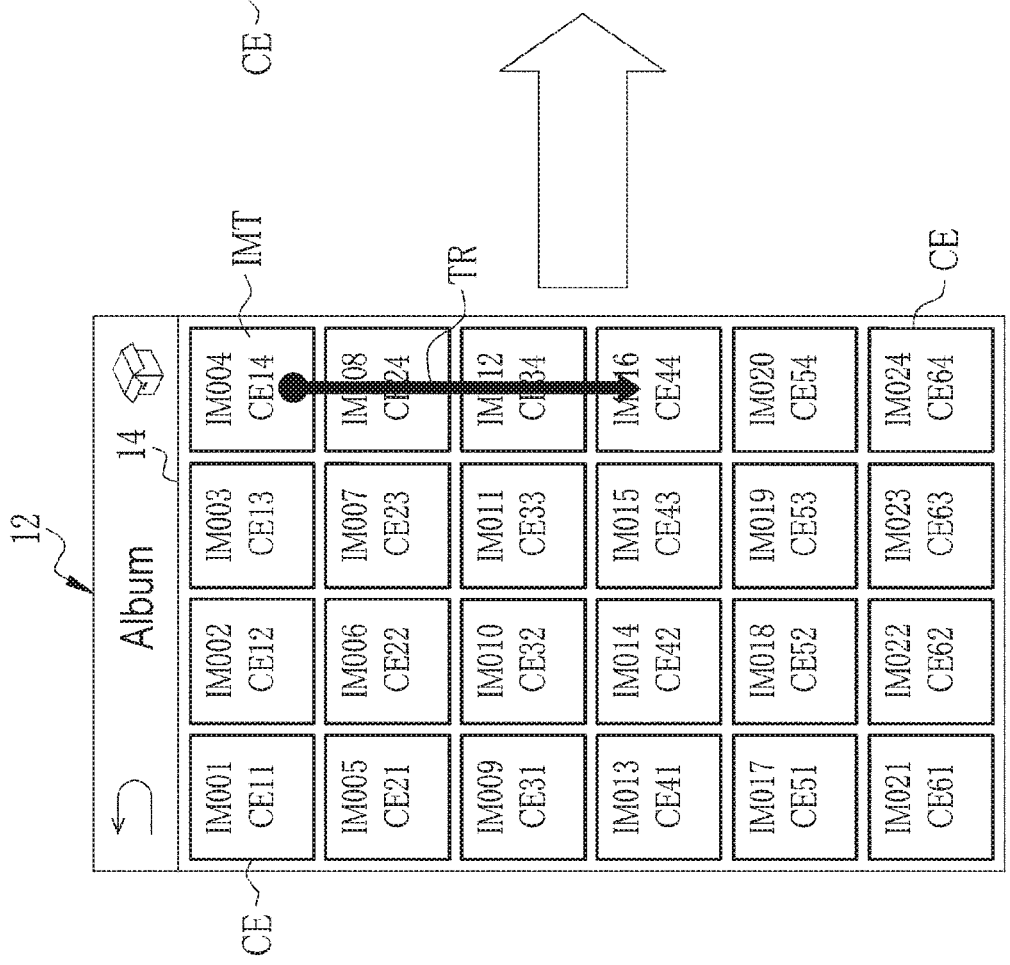
FIG. 19A
FIG. 19B

FIG. 21A / FIG. 21B

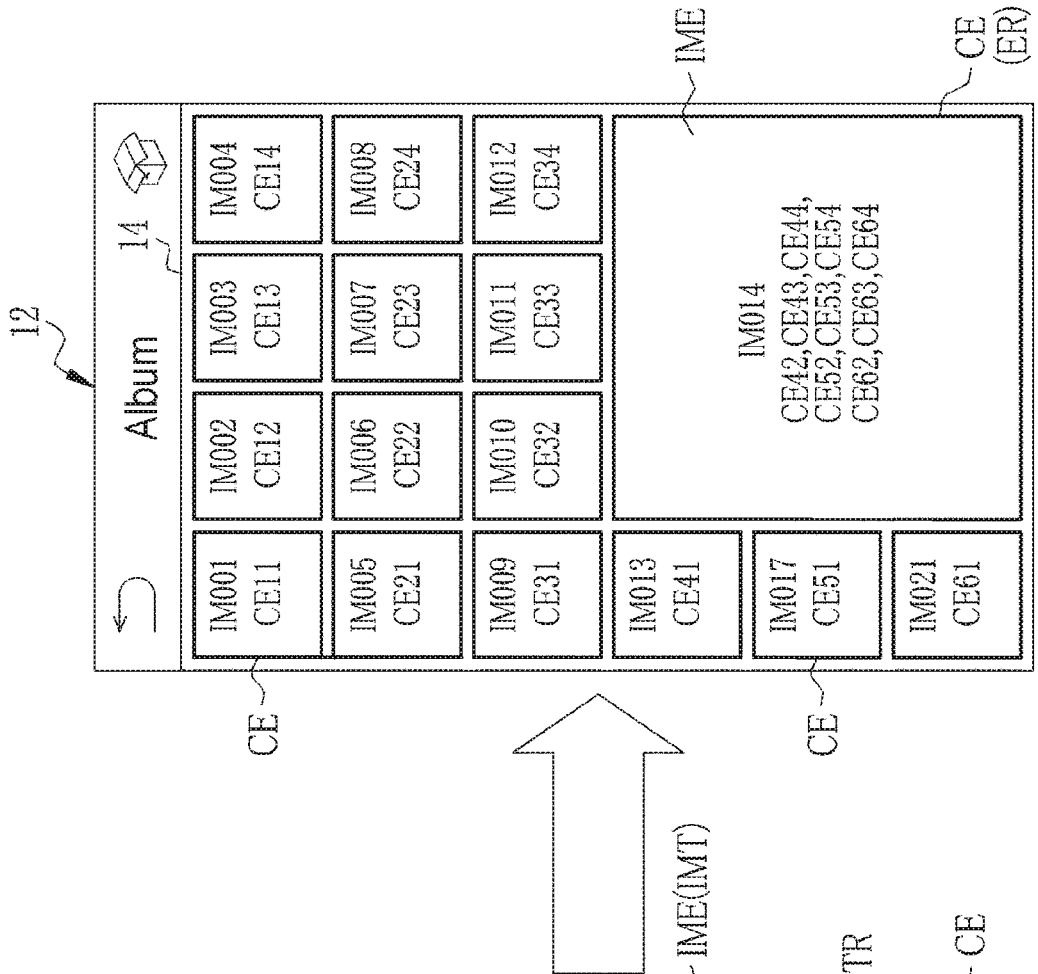

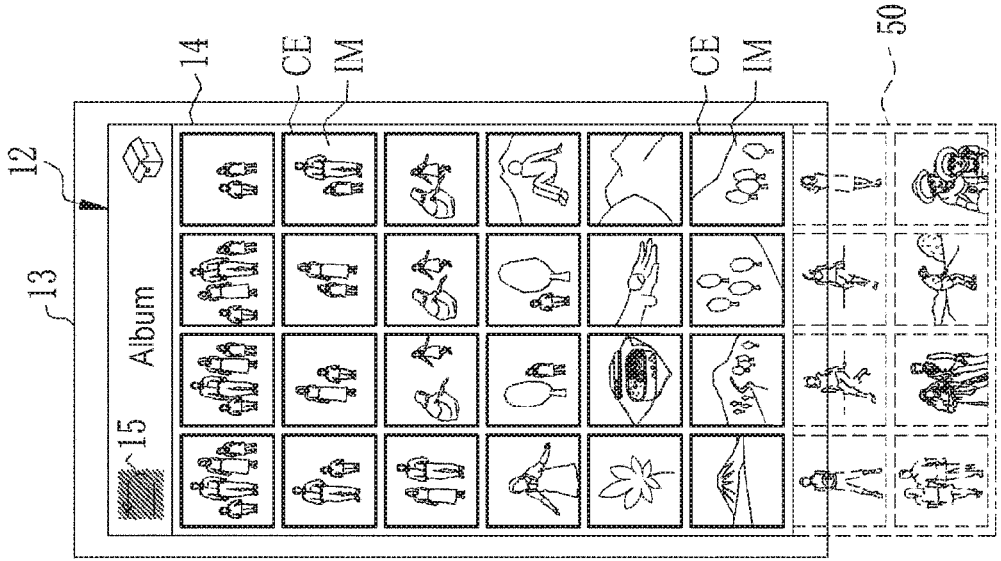
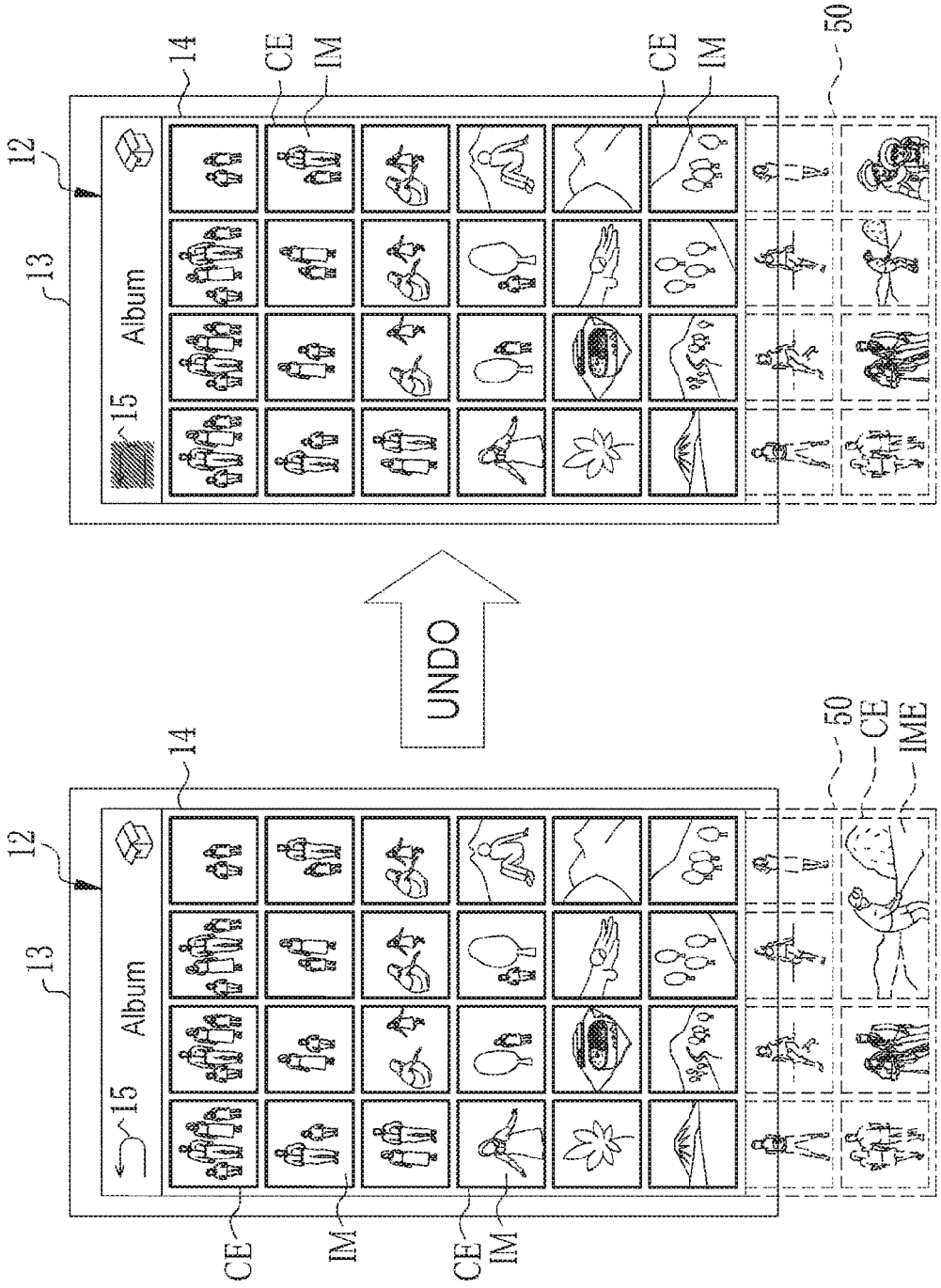

ELECTRONIC ALBUM APPARATUS, AND OPERATION METHOD AND OPERATION PROGRAM FOR THE SAME

CROSS-REFERENCE TO RELATED APPLICATIONS

This application is a Continuation of PCT International Application No. PCT/JP2019/001484 filed on 18 Jan. 2019, which claims priority under 35 U.S.C § 119(a) to Japanese Patent Application No. 2018-020905 filed on 8 Feb. 2018. The above application is hereby expressly incorporated by reference, in its entirety, into the present application.

BACKGROUND OF THE INVENTION

1. Field of the Invention

The present invention relates to an electronic album apparatus, and an operation method and operation program for the same.

2. Description of the Related Art

There are widespread electronic album apparatuses that generate an album screen to be displayed on a touch panel display (hereinafter abbreviated as a touch panel) and including an album page in which a plurality of images are arranged in accordance with preferences of a user (see JP2017-117479A). In JP2017-117479A, paragraph [0203] of the specification and FIG. 16(b) describe that images are arranged in an album page in accordance with a display order that is based on an attribute, such as a shooting date and time. Also described is that, when it is impossible to display the entire album page on a touch panel display at one time, scroll display of the album page is performed in response to a scroll instruction from a user.

SUMMARY OF THE INVENTION

When creating an electronic album, a user selects an image to be taken into the electronic album and an image not to be taken into the electronic album. The user deletes the image not to be taken into the electronic album from an album page. However, selection of an image is not always performed once, and the user may want to return an image once deleted from the album page to the album page.

Accordingly, the inventor has considered an electronic album apparatus that receives a return instruction to return a deleted image, which is an image deleted from an album page in response to an instruction from a user, to the album page. In this case, no problem may occur if the number of deleted images is relatively small. If the number of deleted images is large, much time or effort is taken for the user to search for a desired deleted image that is to be returned to the album page.

An object of the present invention is to provide an electronic album apparatus capable of returning to an album page an image once deleted from the album page without much time or effort, and an operation method and operation program for the same.

To achieve the above object, an electronic album apparatus includes: a screen generating unit that generates an album screen to be displayed on a touch panel display, the album screen including an album page in which a plurality of images are arranged; an instruction receiving unit that receives a gesture instruction to the touch panel display, the instruction receiving unit receiving, as the gesture instruction, a scroll instruction for the album page and a return instruction to return a deleted image to the album page, the deleted image being an image deleted from the album page; and an album editing unit that executes an album editing process including a scroll display process of performing scroll display of the album page in response to the scroll instruction and a return process of returning the deleted image to the album page in response to the return instruction, the album editing unit executing, as the album editing process, an extraction process of extracting, from among a plurality of the deleted images, an identical-attribute image which is the deleted image whose attribute is identical to an attribute of one of the plurality of images present in the album page at a current position of the scroll display, and a list display process of displaying, together with the album page, a list of the identical-attribute image that has been extracted.

Preferably, the album editing unit arranges the plurality of images in the album page in accordance with a display order that is based on the attribute.

Preferably, in a case where the plurality of images present in the album page at the current position of the scroll display are images of a plurality of groups whose attributes are different from each other, the album editing unit extracts, as the identical-attribute image, the deleted image whose attribute is identical to the attribute of a group of images accounting for a largest occupancy proportion in the album page among the plurality of groups.

Preferably, in a case where the plurality of images present in the album page at the current position of the scroll display are images of a plurality of groups whose attributes are different from each other, the screen generating unit displays the images in a display format in which the plurality of groups are identifiable.

Preferably, the instruction receiving unit receives, as the gesture instruction, a display instruction and a hiding instruction for the list, and the album editing unit executes the list display process in response to the display instruction and executes a list hiding process of hiding the list in response to the hiding instruction.

Preferably, the attribute is based on at least any one of an image quality of the image, a photographic subject of the image, a shooting date and time of the image, or a shooting location of the image.

Preferably, the screen generating unit generates the album page in which image display cells are arranged in a grid pattern on the basis of a unit cell whose size is defined in advance, the image display cells displaying the plurality of images, each image display cell having a size that is changed to a positive integral multiple of the unit cell.

Preferably, the instruction receiving unit receives, as the gesture instruction, an enlargement instruction to display an image among the plurality of images in an enlarged view within the album page, the album editing unit executes, as the album editing process, a recognition process of recognizing an enlargement target image that is the image for which the enlargement instruction has been provided, an enlargement process of enlarging the enlargement target image recognized in the recognition process, and a deletion process of deleting one or more images among the plurality of images from the album page, the one or more images being different from the enlargement target image and overlapping an enlargement region which is a region of the enlargement target image that has been enlarged, and the one or more images that have undergone the deletion process are handled as the deleted images.

Preferably, the enlargement region is a region having a size that is a positive integral multiple of the unit cell.

Preferably, the instruction receiving unit receives, as the enlargement instruction, a swipe instruction of moving one finger along the enlargement region within the album page starting from the enlargement target image.

An operation method for an electronic album apparatus according to the present invention includes: a screen generation step of generating an album screen to be displayed on a touch panel display, the album screen including an album page in which a plurality of images are arranged; an instruction reception step of receiving a gesture instruction to the touch panel display, the instruction reception step receiving, as the gesture instruction, a scroll instruction for the album page and a return instruction to return a deleted image to the album page, the deleted image being an image deleted from the album page; and an album editing step of executing an album editing process including a scroll display process of performing scroll display of the album page in response to the scroll instruction and a return process of returning the deleted image to the album page in response to the return instruction, the album editing step executing, as the album editing process, an extraction process of extracting, from among a plurality of the deleted images, an identical-attribute image which is the deleted image whose attribute is identical to an attribute of one of the plurality of images present in the album page at a current position of the scroll display, and a list display process of displaying, together with the album page, a list of the identical-attribute image that has been extracted.

An operation program for an electronic album apparatus according to the present invention causes a computer to execute: a screen generation function of generating an album screen to be displayed on a touch panel display, the album screen including an album page in which a plurality of images are arranged; an instruction reception function of receiving a gesture instruction to the touch panel display, the instruction reception function receiving, as the gesture instruction, a scroll instruction for the album page and a return instruction to return a deleted image to the album page, the deleted image being an image deleted from the album page; and an album editing function of executing an album editing process including a scroll display process of performing scroll display of the album page in response to the scroll instruction and a return process of returning the deleted image to the album page in response to the return instruction, the album editing function executing, as the album editing process, an extraction process of extracting, from among a plurality of the deleted images, an identical-attribute image which is the deleted image whose attribute is identical to an attribute of one of the plurality of images present in the album page at a current position of the scroll display, and a list display process of displaying, together with the album page, a list of the identical-attribute image that has been extracted.

The present invention is capable of providing an electronic album apparatus capable of returning to an album page an image once deleted from the album page without much time or effort, and an operation method and operation program for the same because, in the case of receiving a return instruction to return to the album page a deleted image deleted from the album page and executing a return process of returning the deleted image to the album page in response to the return instruction, an identical-attribute image is extracted from among a plurality of deleted images, the identical-attribute image being a deleted image whose attribute is identical to that of an image present in the album page at a current position of scroll display, and a list of the extracted identical-attribute image is displayed together with the album page.

BRIEF DESCRIPTION OF THE DRAWINGS

FIGS. 7A and 7B are diagrams illustrating a state where the trimming position of an image is adjusted, in which FIG. 7A illustrates a state before adjustment and FIG. 7B illustrates a state after adjustment;

FIGS. 8A and 8B are diagrams illustrating a state of scroll display, in which FIG. 8A illustrates a case where a hidden portion is present at a lower portion of the album page and FIG. 8B illustrates a case where a hidden portion is present at an upper portion of the album page;

FIGS. 10A and 10B are diagrams of a part of the album page, in which FIG. 10A illustrates a state before an enlargement process and FIG. 10B illustrates a state after the enlargement process;

FIG. 11 is an explanatory diagram of an enlargement process;

FIG. 14 is a diagram illustrating album management information;

FIGS. 19A and 19B are diagrams illustrating an example in which unit cells are combined in a column direction to perform enlarged display in response to an enlargement instruction of linearly moving a finger in the column direction, in which FIG. 19A illustrates a state before an enlargement process and FIG. 19B illustrates a state after the enlargement process;

FIGS. 20A and 20B are diagrams illustrating an example in which unit cells are combined over a plurality of rows and a plurality of columns to perform enlarged display in response to an enlargement instruction of moving a finger over the plurality of rows and the plurality of columns, in which FIG. 20A illustrates a state before an enlargement process and FIG. 20B illustrates a state after the enlargement process;

FIGS. 21A and 21B are diagrams illustrating an example in which an enlargement instruction and enlarged display are performed a plurality of times within the album page, in which FIG. 21A illustrates a state before an enlargement process and FIG. 21B illustrates a state after the enlargement process;

FIGS. 22A and 22B are diagrams illustrating an example in which an enlarged image is designated as an enlargement target image, in which FIG. 22A illustrates a state before an enlargement process and FIG. 22B illustrates a state after the enlargement process;

FIGS. 23A and 23B are diagrams illustrating an example in which a finger is moved along image display cells to draw a loop, in which FIG. 23A illustrates a state before an enlargement process and FIG. 23B illustrates a state after the enlargement process;

FIGS. 24A and 24B are diagrams illustrating another example in which a finger is moved along image display cells to draw a loop, in which FIG. 24A illustrates a state before an enlargement process and FIG. 24B illustrates a state after the enlargement process;

FIGS. 35A and 35B are diagrams illustrating a case where the image display cell of an enlarged image as a target of undoing of an enlargement process is present in a hidden portion, in which FIG. 35A illustrates a state before undoing and FIG. 35B illustrates a state after undoing;

FIGS. 36A and 36B are diagrams illustrating a case where the image display cell of an enlarged image as a target of undoing of an enlargement process is present in a hidden portion, in which FIG. 36A illustrates a state before undoing and FIG. 36B illustrates a state after undoing;

FIGS. 38A and 38B are diagrams illustrating a mode in which a spiral gesture instruction for the image display cell of an enlargement target image is received as an enlargement instruction, in which FIG. 38A illustrates a state before an enlargement process and FIG. 38B illustrates a state after the enlargement process.

DESCRIPTION OF THE PREFERRED EMBODIMENTS

First Embodiment

Figure 1:
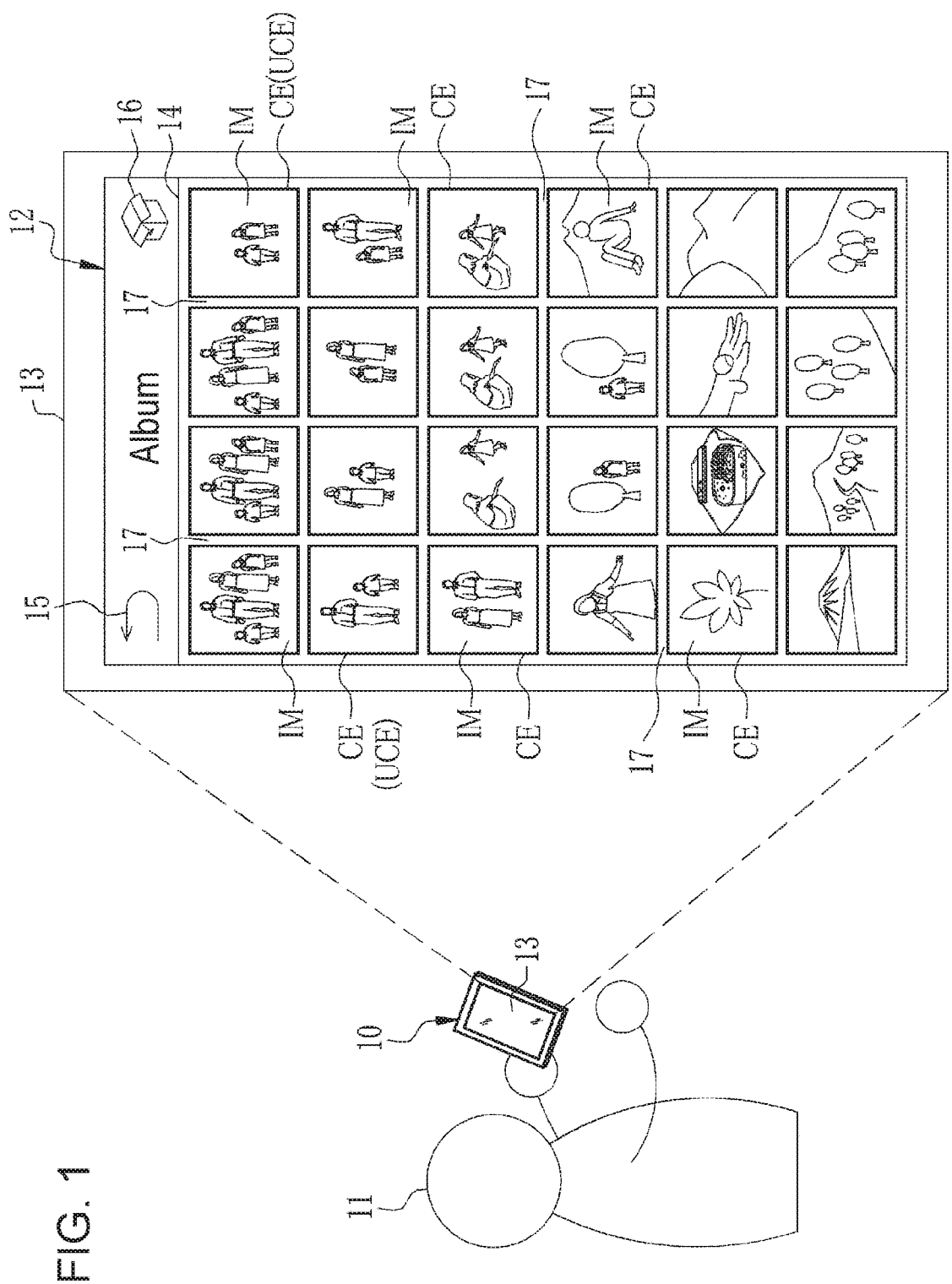
FIG. 1 is a diagram illustrating a smartphone functioning as an electronic album apparatus and an album screen displayed on the touch panel thereof.

In FIG. 1, a smartphone 10 corresponding to an electronic album apparatus according to the present invention is a kind of mobile information terminal carried by and used by a user 11. The smartphone 10 functions as a mobile phone or a digital camera as well known.

The smartphone 10 also functions as a computer that executes various application programs (hereinafter abbreviated as applications). The smartphone 10 has, installed therein, an electronic album application 30 (see FIG. 3) serving as one of applications and corresponding to an operation program for the electronic album apparatus according to the present invention. When the electronic album application 30 is activated, the smartphone 10 serving as a computer functions as an electronic album apparatus. The electronic album application 30 is an application that allows the user 11 to view images IM, such as photographs captured by the smartphone 10 or photographs obtained from a website, and to create an electronic album in which a plurality of images IM are arranged in accordance with preferences of the user 11.

Each image IM has an exchangeable image file format (Exif) region of the data file constituting the image IM. The Exif region stores various pieces of accessory information, such as a shooting date and time and a shooting location (longitude, latitude, and altitude information obtained from the Global Positioning System (GPS)), in association with image identification data (ID) for identifying the image IM.

The electronic album application 30 generates an album screen 12 and displays the generated album screen 12 on a touch panel 13 provided on a front surface of the smartphone 10. The album screen 12 includes an album page 14 in which a plurality of images IM are arranged.

An upper portion of the album screen 12 is provided with an undo button 15 and a list display button 16. The undo button 15 is a button for undoing an enlargement process of enlarging an image IM. The list display button 16 is a button for displaying an identical-attribute image list 60, which is a list of identical-attribute images IMS (see FIG. 12). The list display button 16 has an external appearance like a corrugated box to which a deleted image IMD (see FIG. 10A), which is an image IM deleted from the album page 14, is casually thrown away. Here, an identical-attribute image IMS is a deleted image IMD whose attribute is identical to that of an image IM present in the album page 14 at a current position of scroll display.

In the album page 14, image display cells CE are arranged in a grid pattern. Each image display cell CE is a rectangular frame displaying an image IM of one frame. In an initial state illustrated in FIG. 1, each image display cell CE is a square-shaped frame having a width that allows four image display cells CE to be arranged in a row direction (a lateral direction) of the album page 14 with gaps 17 therebetween. The image display cell CE with a square-shaped frame is the minimum unit of the image display cell CE and corresponds to a unit cell UCE whose size is defined in advance. As the details will be described below, the size of the image display cell CE changes to a positive integral multiple (1, 2, 3, 4, or the like) of the unit cell UCE.

In the initial state, not all the image display cells CE may be unit cells UCE. For example, in a case where an evaluation of each image IM by the user 11 is stored as accessary information, an enlargement process may be automatically performed on an image IM having an evaluation higher than a threshold value, and the image display cell CE of the image IM may be enlarged to several times (for example, four times of two rows×two columns) the unit cell UCE in the initial state. Alternatively, a similar process may be performed on an image IM whose evaluation value based on the image quality is larger than a threshold value, which will be described below.

The individual image display cells CE are arranged with the gaps 17 therebetween also in a column direction (a vertical direction). The above "image display cells CE are arranged in a grid pattern" means a state where the gaps 17 that partition the individual image display cells CE extend in the row direction and the column direction of the album page 14 and the individual image display cells CE constitute cells of the grid.

In the electronic album application 30, an image IM can be displayed in an enlarged view in response to a gesture instruction to the touch panel 13 using a finger F (for example, a forefinger, see FIG. 7A) of the user 11. The user 11 causes the electronic album application 30 to execute a desired album editing process by providing a gesture instruction.

Figure 2:
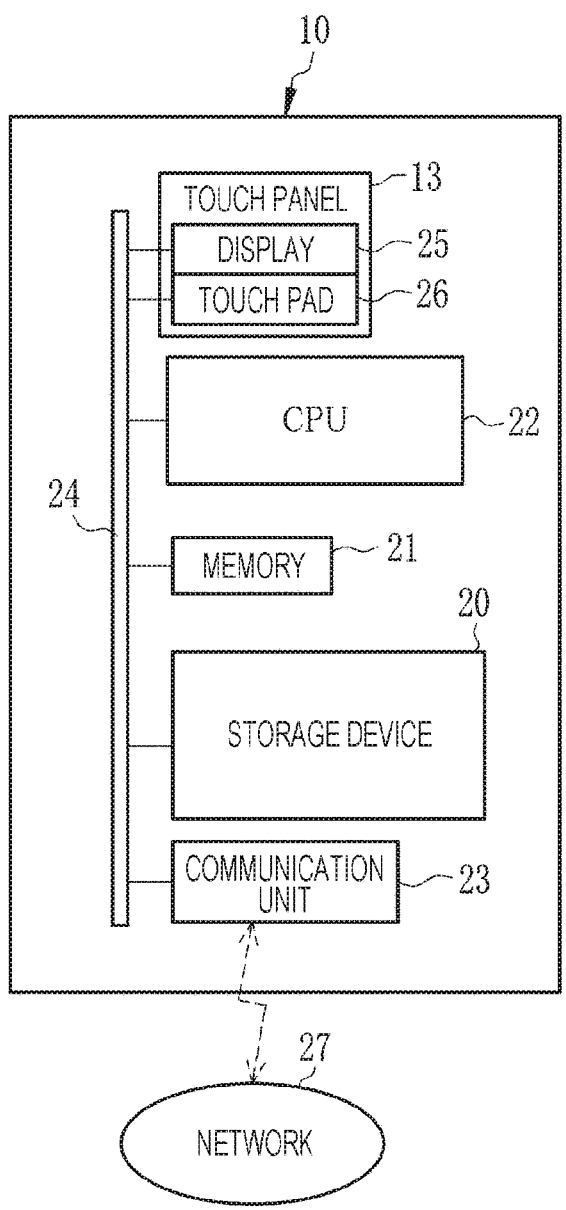
FIG. 2 is a block diagram of a computer constituting the smartphone.

In FIG. 2, the smartphone 10 includes, in addition to the above-described touch panel 13, a storage device 20, a memory 21, a central processing unit (CPU) 22, and a communication unit 23. These devices are connected to each other via a data bus 24.

The touch panel 13 is constituted by a thin flat display 25, such as a liquid crystal display or an organic electroluminescence (EL) display, and a thin flat touch pad 26 disposed on the display 25. Various screens including the album screen 12 is displayed on the display 25. The touch pad 26 detects a touch of the finger F of the user 11 and recognizes a gesture instruction.

The storage device 20 is a nonvolatile semiconductor memory, such as a flash memory or a solid state drive (SSD). The storage device 20 stores a control program such as an operating system, various applications including the electronic album application 30, graphical user interface (GUI) data of various screens accompanying these programs, and the like. The applications include those preinstalled in the smartphone 10 and those optionally downloaded and installed by the user 11 from an application distribution server to the smartphone 10 through a network 27, such as a mobile communication network or the Internet, such as the electronic album application 30.

The memory 21 is a work memory for the CPU 22 to execute a process and is constituted by a random access memory (RAM). The CPU 22 loads a program stored in the storage device 20 to the memory 21 and executes a process in accordance with the program, thereby centrally controlling each component of the smartphone 10.

The communication unit 23 is an interface for wireless communication and performs transmission control related to wireless communication. The interface for wireless communication includes a mobile communication interface to connect to a mobile communication network, an interface of a wireless local area network (LAN) standard of the Institute of Electrical and Electronics Engineers, Inc. (IEEE) 802.11 series to connect to a wireless router, an interface for near field wireless communication using infrared or the like, and the like. The smartphone 10 connects to the network 27 via the communication unit 23.

Figure 3:
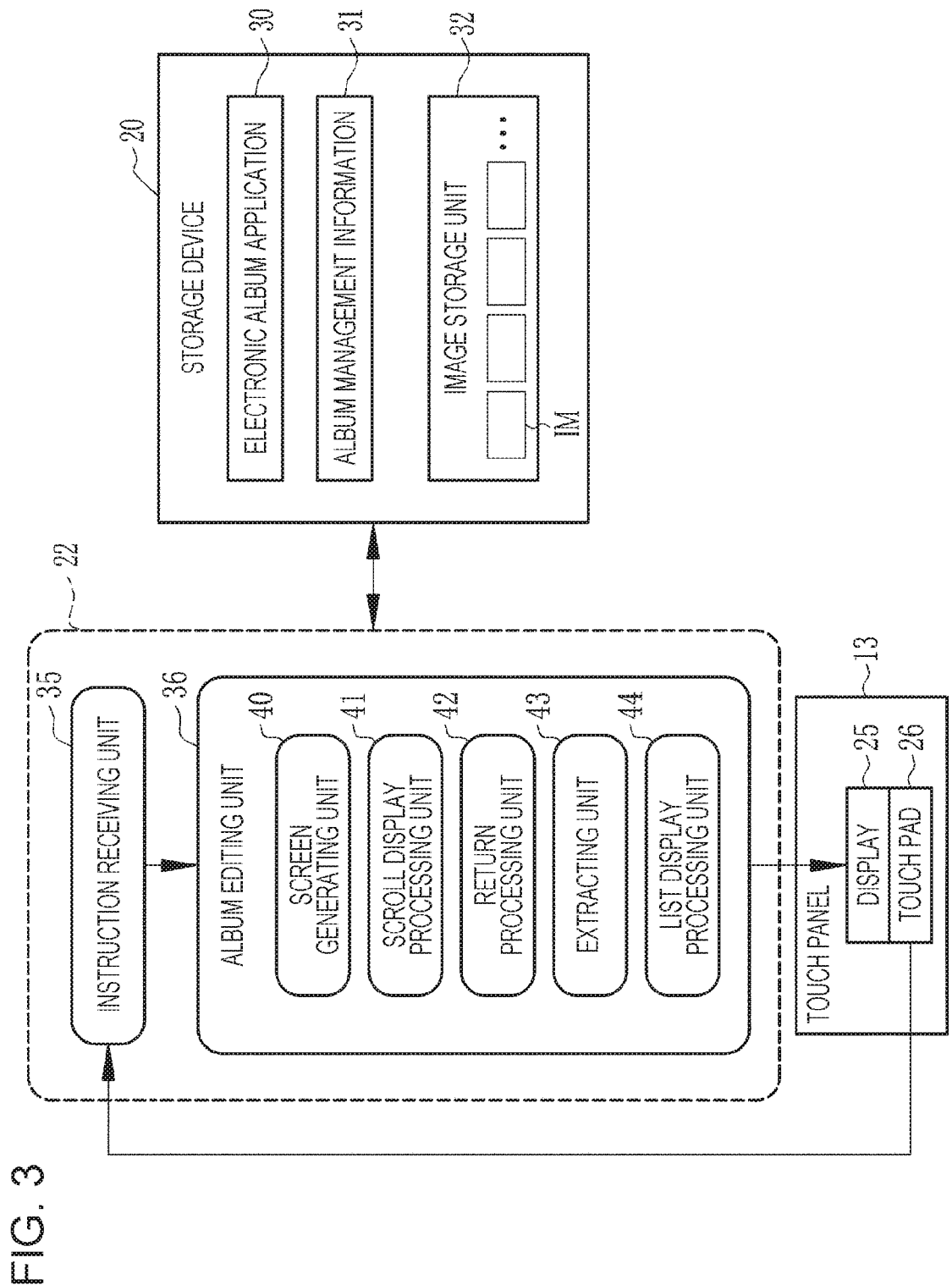
FIG. 3 is a block diagram of a storage device and CPU of the smartphone.

In FIG. 3, the storage device 20 stores the electronic album application 30 and album management information 31 generated by the electronic album application 30. In addition, the storage device 20 has an image storage unit 32 that stores images IM together with image IDs and accessory information.

When the electronic album application 30 is activated, the CPU 22 functions as an instruction receiving unit 35 and an album editing unit 36. The album editing unit 36 includes a screen generating unit 40, a scroll display processing unit 41, a return processing unit 42, an extracting unit 43, and a list display processing unit 44.

The instruction receiving unit 35 has an instruction reception function of receiving a gesture instruction input via the touch pad 26. The instruction receiving unit 35 outputs information about a received gesture instruction to the album editing unit 36. The gesture instruction mainly relates to edit of an electronic album, and includes a scroll instruction to perform scroll display of the album page 14 and the identical-attribute image list 60, a return instruction to return a deleted image IMD to the album page 14, an enlargement instruction to display an image in an enlarged view within the album page 14, and so forth.

The album editing unit 36 has an album editing function of executing various album editing processes in accordance with information about a gesture instruction received from the instruction receiving unit 35.

The screen generating unit 40 has a screen generation function of generating the album screen 12. The screen generating unit 40 outputs the album screen 12 that has been generated to the display 25.

The scroll display processing unit 41 executes, in response to a scroll instruction, a scroll display process of performing scroll display of the album page 14 and the identical-attribute image list 60. The return processing unit 42 executes, in response to a return instruction, a return process of returning a deleted image IMD to the album page 14.

The extracting unit 43 executes an extraction process of extracting an identical-attribute image IMS from among a plurality of deleted images IMD. The extracting unit 43 outputs the extracted identical-attribute image IMS to the list display processing unit 44. The list display processing unit 44 generates the identical-attribute image list 60 on the basis of the identical-attribute image IMS received from the extracting unit 43. Subsequently, the list display processing unit 44 executes a list display process of displaying the identical-attribute image list 60 together with the album page 14.

The album editing unit 36 executes an enlargement process of enlarging an enlargement target image IMT (see FIG. 9), which is an image IM for which an enlargement instruction has been provided. In addition, the album editing unit 36 executes a deletion process of deleting an image IM from the album page 14.

Here, an image IM subjected to a deletion process is an image IM other than the enlargement target image IMT and is an image IM that overlaps an enlargement region ER (see FIG. 9), which is a region of the enlargement target image IMT that has been enlarged. The image IM that overlaps the enlargement region ER and that is to be deleted from the album page 14 is handled as a deleted image IMD. Hereinafter, the enlargement target image IMT that has undergone an enlargement process by the album editing unit 36 will be referred to as an enlarged image IME (see FIG. 10B).

Prior to output of the album screen 12, the screen generating unit 40 outputs to the display 25 a reception screen (not illustrated) that receives designation about an attribute of images IM to be arranged in the album page 14. In a case where no designation is received from the user 11 on this reception screen, the album editing unit 36 reads out all the images IM from the image storage unit 32 and arranges all the read out images IM in the album page 14. On the other hand, in a case where designation of an attribute, for example, a specific shooting date and time or shooting location, is received on the reception screen from the user 11, the album editing unit 36 searches the image storage unit 32 for an image IM captured on the designated shooting date and time or an image IM captured at the designated shooting location and arranges the image IM obtained through the search in the album page 14.

Figure 4:
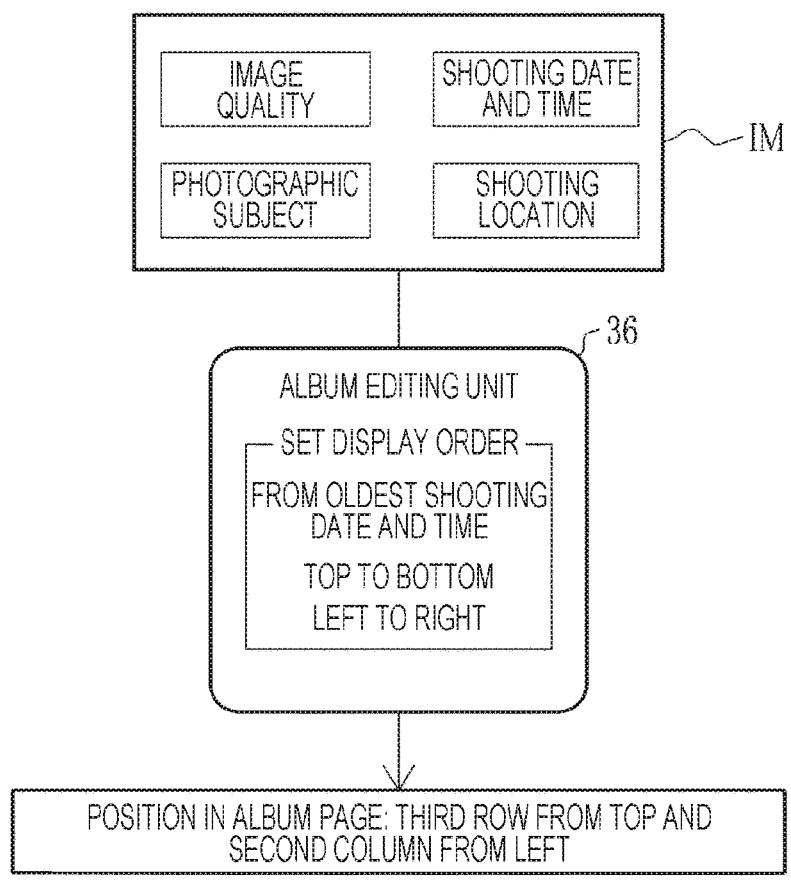
FIG. 4 is a diagram illustrating a state where the positions of images arranged in an album page are determined in accordance with the setting of a display order that is based on an attribute.

As illustrated in FIG. 4, the album editing unit 36 arranges the images IM in the album page 14 in accordance with a display order that is based on an attribute. FIG. 4 illustrates an example of setting a display order in which the images IM are arranged in order from the image IM of the oldest shooting date and time to the image IM of the newest shooting date and time from the top to the bottom and from the left to the right of the album page 14. In this case, the image IM displayed in the image display cell CE at the left end of the top row of the album page 14 has the oldest shooting date and time, and the image IM displayed in the image display cell CE at the right end of the bottom row of the album page 14 has the newest shooting date and time.

In a case where the shooting date and time is not recorded in the Exif region, the date and time when the data file of the image IM was created may be used instead of the shooting date and time. In a case where the shooting date and time is not recorded in the Exif region and the image IM has been obtained from a website, the date and time when the image IM was obtained from the website may be used instead of the shooting date and time. Furthermore, in a case where the shooting date and time is not recorded in the Exif region, the date and time when the data file of the image IM was created or the date and time when the image IM was obtained from the website may be recorded in a region for recording a shooting date and time in the Exif region.

The attribute includes, in addition to the above-described shooting date and time, an attribute based on the image quality of the image IM, the photographic subject of the image IM, and the shooting location of the image IM. In the case of the image quality, it is determined whether or not the brightness, saturation, tint, unsharpness, blur, composition, and the like of the images IM are appropriate, and evaluation values of the image quality are calculated on the basis of the determination result. Subsequently, a display order is set in which the images IM are arranged, for example, in descending order of the evaluation value from the top to the bottom and from the left to the right of the album page 14. The calculated evaluation values are stored as accessory information in the image storage unit 32 in association with the images IM. Such a method for deriving evaluation values is known as described in, for example, JP5655112B, and thus the detailed description thereof is omitted.

In the case of the photographic subject, for example, persons are registered in advance together with the degrees of importance, and the faces of persons in the images IM are extracted. Subsequently, a display order is set in which the images IM are arranged, for example, in descending order of the degree of importance of the persons from which the faces have been extracted, from the top to the bottom and from the left to the right of the album page 14. The persons from which the faces have been extracted are stored as accessory information in the image storage unit 32 in association with the images IM.

In the case of the shooting location, the images IM are grouped by prefecture or municipality. Subsequently, a display order is set in which the images IM are arranged, for example, in the order from the north to the south and from the east to the west, from the top to the bottom and from the left to the right of the album page 14.

The setting of the display order can be freely selected by the user 11, for example, on the reception screen. The display order is not limited to that based on any one of the above-described image quality, photographic subject, shooting date and time, and shooting location, and may be a display order based on, for example, a combination of the shooting date and time and the image quality.

Figure 5:
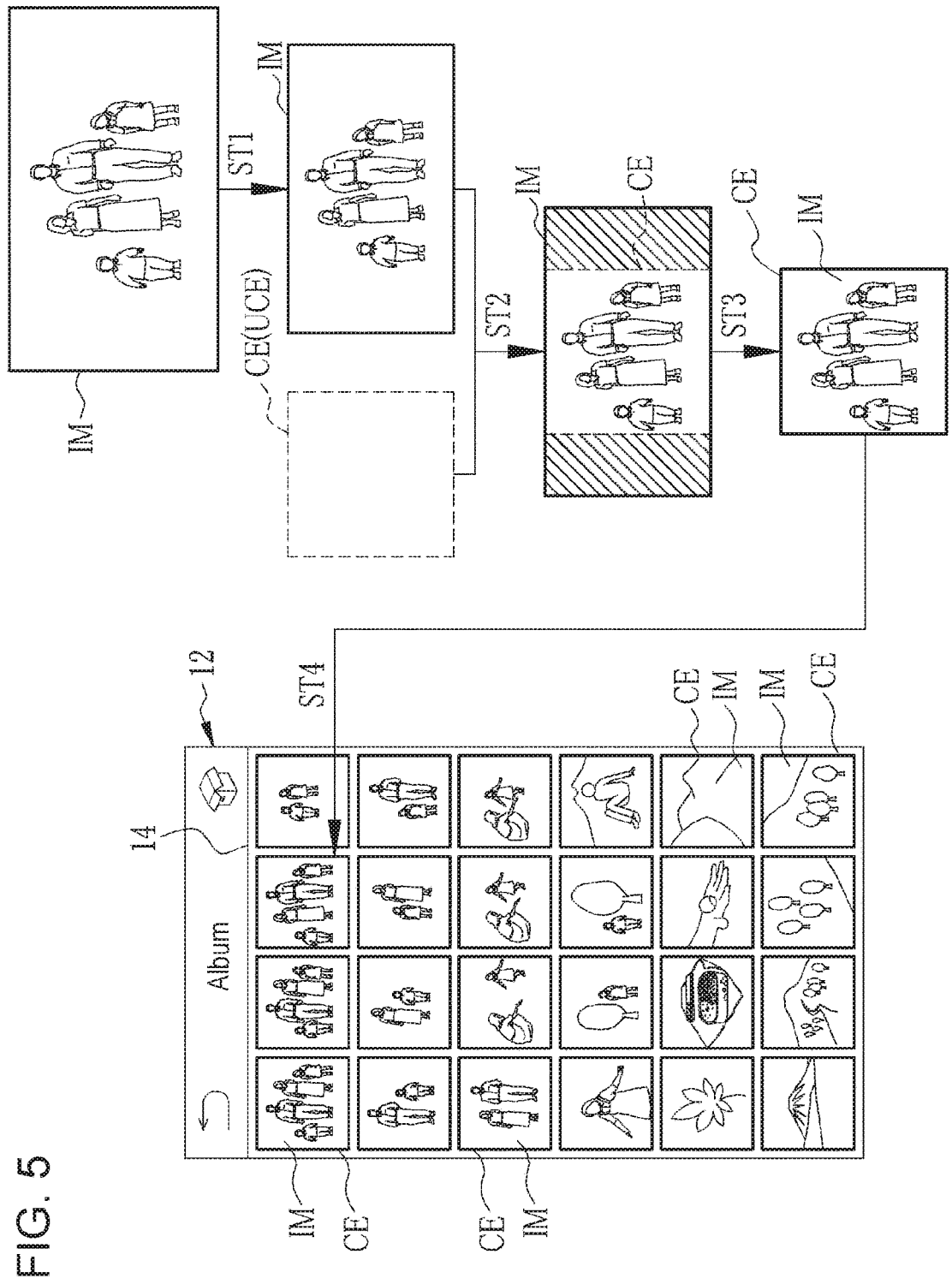
FIG. 5 is an explanatory diagram of a process of arranging images in the album page.

As illustrated in FIG. 5, the album editing unit 36 trims an image IM in accordance with the shape of the image display cell CE before arranging the image IM in the album page 14. In the example in FIG. 5, the image display cell CE is a unit cell UCE and is a square-shaped frame. On the other hand, the image IM is a rectangle with an aspect ratio of 16:9.

First, in step ST1, the album editing unit 36 reduces the size of the image IM such that the length in the column direction of the image IM matches the length of one side of the image display cell CE. Subsequently, in step ST2, the image display cell CE is placed at the center portion of the reduced image IM. Subsequently, in step ST3, the left and right edge portions (hatched portions) of the image IM other than the center portion at which the image display cell CE has been placed are trimmed away. Finally, in step ST4, the image display cell CE in which the trimmed image IM is displayed is arranged at a position corresponding to a display order in the album page 14. The album editing unit 36 repeatedly performs the series of steps ST1 to ST4 a number of times corresponding to the number of images IM to be arranged in the album page 14.

Figure 6:
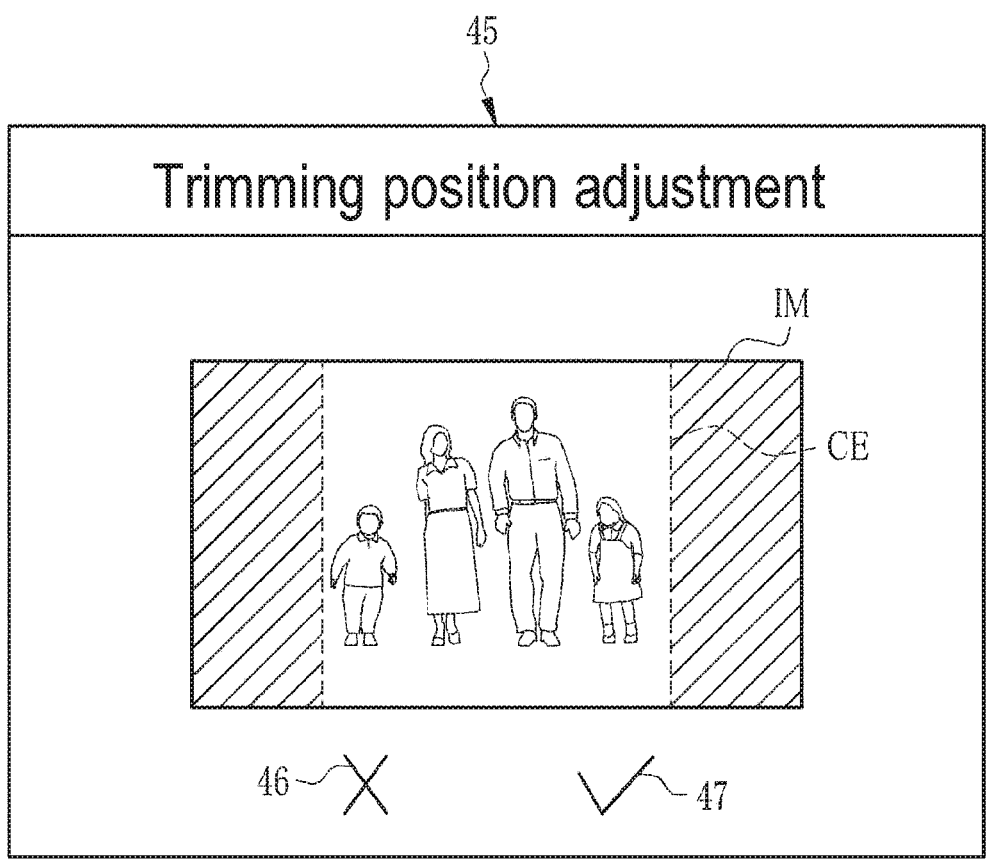
FIG. 6 is a diagram illustrating a trimming position adjustment screen.

When a gesture instruction of consecutively tapping twice an image display cell CE with the finger F (a double-tap instruction) is provided in the album page 14, the album editing unit 36 causes the display 25 to display a trimming position adjustment screen 45 illustrated in FIG. 6. On the trimming position adjustment screen 45, the image display cell CE selected by the double-tap instruction and the image IM thereof are displayed, and a cancel button 46 and a check button 47 are provided below the image display cell CE and the image IM.

Figure 7A:
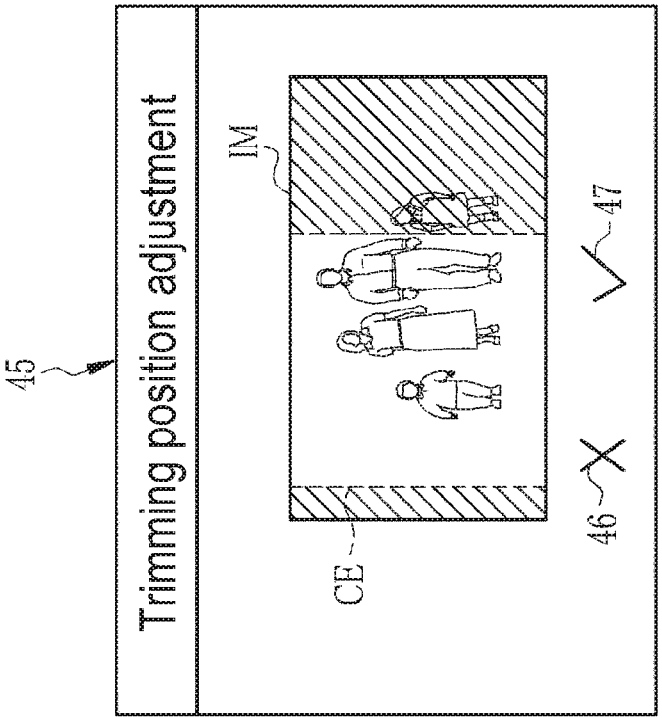
Figure 7B:
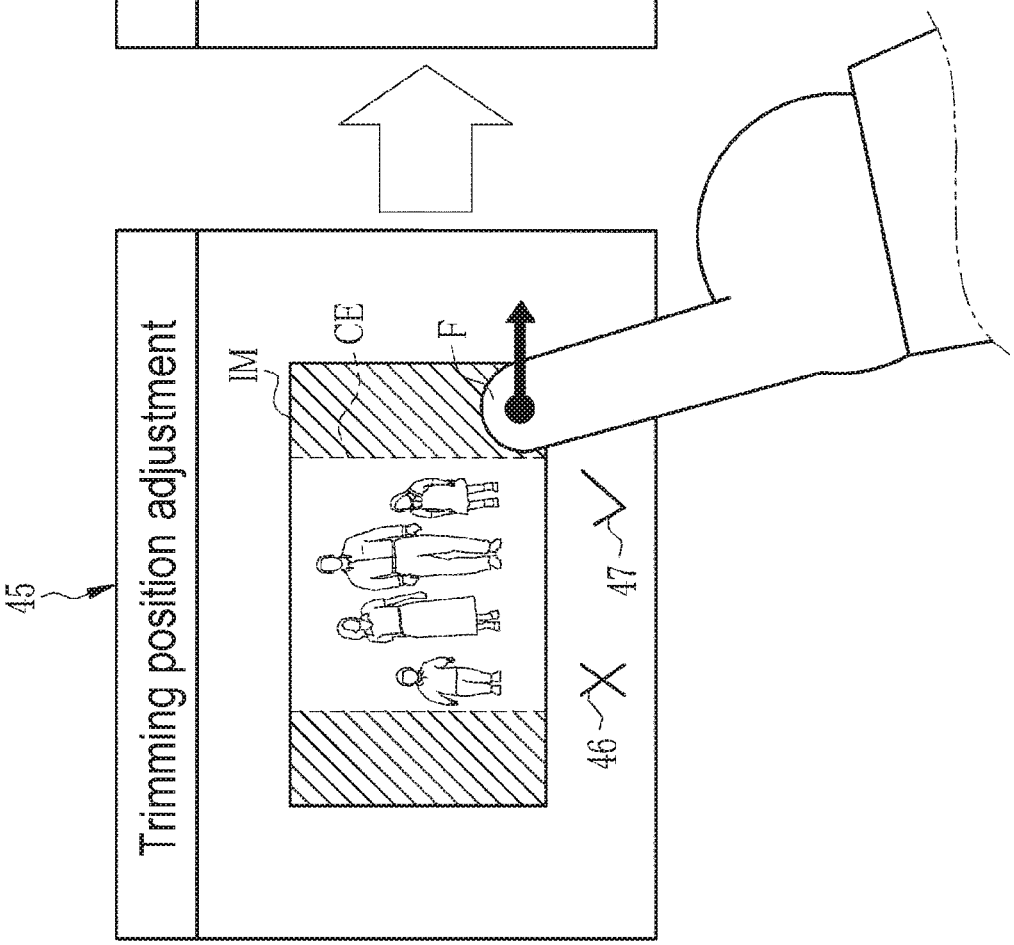

As illustrated in FIGS. 7A and 7B, the trimming position of the image IM can be adjusted on the trimming position adjustment screen 45. Specifically, when a gesture instruction of touching the image IM in the trimming position adjustment screen 45 with the finger F and moving the finger F in a desired direction (here, a right direction) is provided as illustrated in FIG. 7A, the image IM is moved in the movement direction of the finger F with the image display cell CE fixed, as illustrated in FIG. 7B. In this way, the trimming position of the image IM is adjusted.

When the check button 47 is selected after the trimming position of the image IM has been adjusted, the trimming position adjustment screen 45 disappears and the album page 14 appears in which the image IM that has undergone the trimming position adjustment is arranged. When the cancel button 46 is selected, the trimming position adjustment screen 45 disappears without the trimming position of the image IM being adjusted. The adjustment of the trimming position on the trimming position adjustment screen 45 can be performed not only on the image IM displayed in the unit cell UCE but also on an enlarged image IME.

Figure 8B:
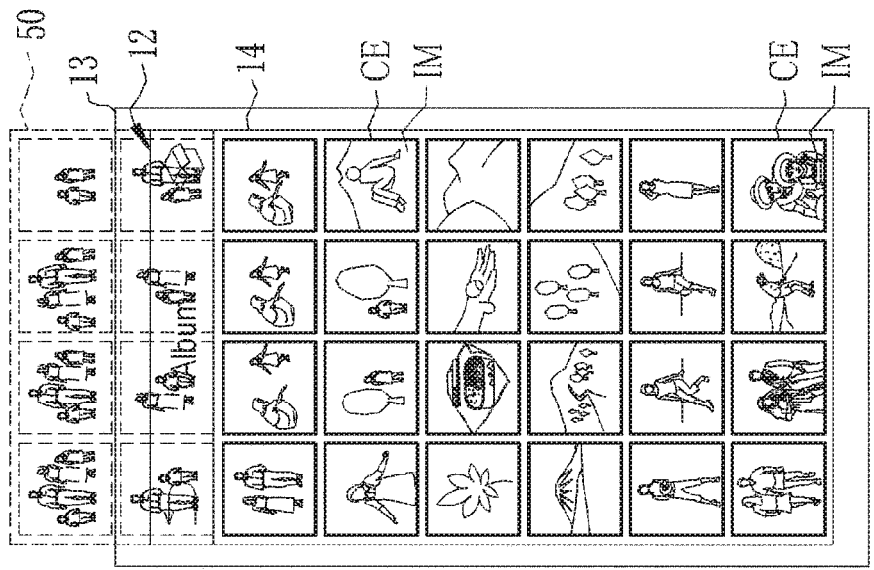
Figure 8A:
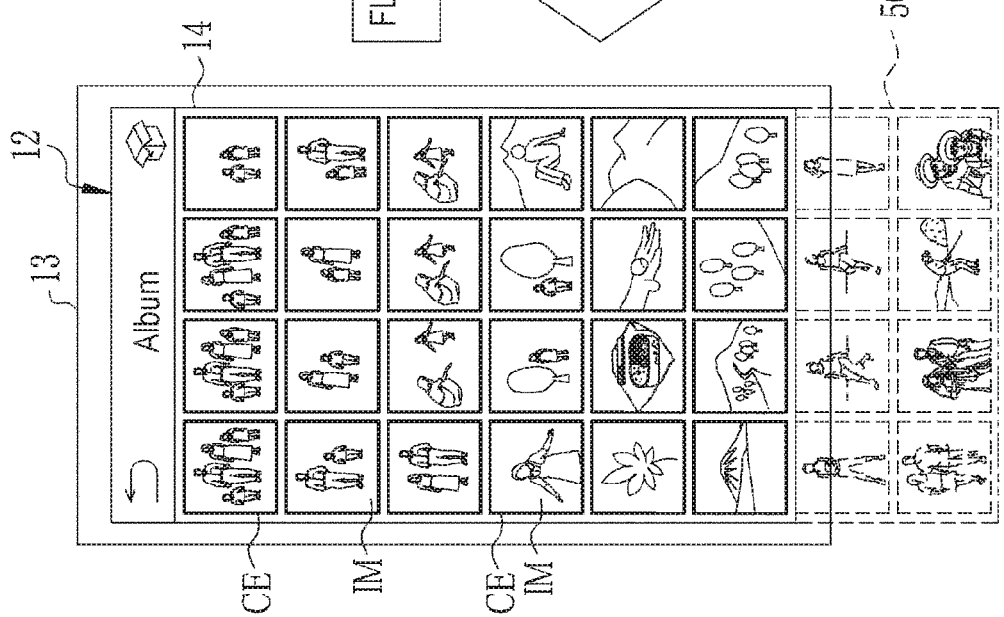

As illustrated in FIGS. 8A and 8B, a scroll instruction to the album page 14 is a gesture instruction of flicking the inside of the album page 14 in an up-down direction with the finger F (a flick instruction). FIG. 8A illustrates a case where a hidden portion 50 indicated by broken lines is present at a lower portion of the album page 14, and FIG. 8B illustrates a case where the hidden portion 50 is present at an upper portion of the album page 14. In FIG. 8A, when the instruction receiving unit 35 receives an upward flick instruction, the scroll display processing unit 41 performs scroll display of the hidden portion 50 at the lower portion of the album page 14, as illustrated in FIG. 8B. Conversely, in FIG. 8B, when the instruction receiving unit 35 receives a downward flick instruction, the scroll display processing unit 41 performs scroll display of the hidden portion 50 at the upper portion of the album page 14, as illustrated in FIG. 8A. Although not illustrated, a scroll instruction and a scroll display process for the identical-attribute image list 60 are similar to those for the album page 14.

Figure 9:
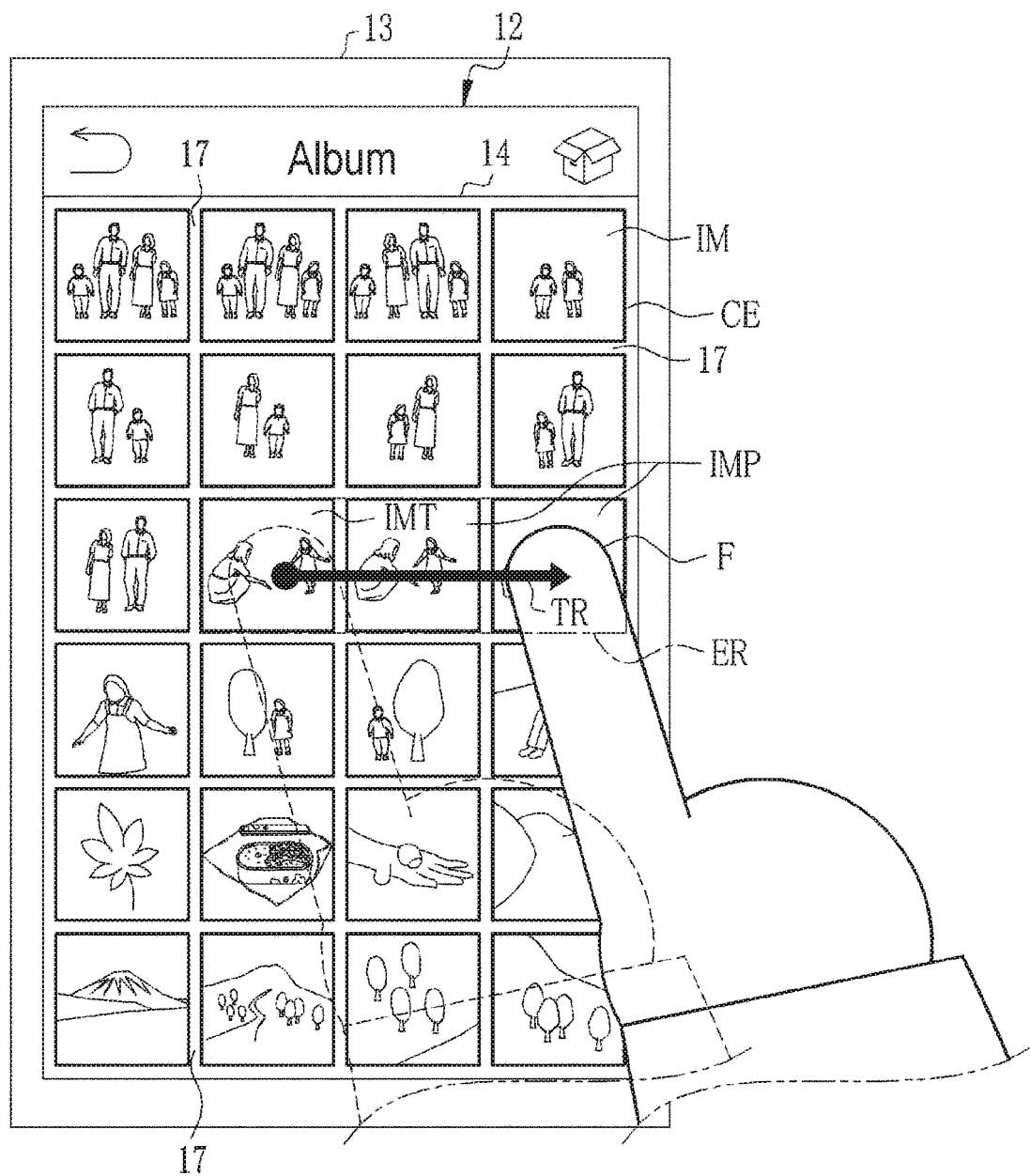
FIG. 9 is a diagram illustrating a state of an enlargement instruction.

In FIG. 9, an enlargement instruction is a swipe instruction of moving a single finger F of the user 11 within the album page 14 starting from an enlargement target image IMT. More specifically, an enlargement instruction starts from a gesture instruction of touching an enlargement target image IMT with the finger F for a predetermined time period (for example, 2 seconds) to select the enlargement target image IMT. Subsequently, a gesture instruction is provided in which the finger F touching the enlargement target image IMT is moved along an enlargement region ER in which the user 11 wants to enlarge the enlargement target image IMT. Finally, a gesture instruction of moving the finger F away from a terminal point of the enlargement region ER is provided.

The enlargement region ER is a region formed by combining the image display cells CE that overlap a trajectory TR of the finger F moved from the image display cell CE of the enlargement target image IMT at a starting point of the finger F of a swipe instruction to the image display cell CE at a terminal point at which the finger F is moved away at the end of the swipe instruction, including the gaps 17. As described above, each image display cell CE is based on the unit cell UCE. Thus, the enlargement region ER formed by combining the image display cells CE that overlap the trajectory TR of the finger F has a size that is a positive integral multiple of the unit cell UCE. To be precise, the enlargement region ER is slightly larger than a positive integral multiple of the unit cell UCE because of the gaps 17, but the gaps 17 are very narrow and ignored.

The instruction receiving unit 35 receives a swipe instruction as described above as an enlargement instruction. The instruction receiving unit 35 outputs, as information about the enlargement instruction, position information of the enlargement target image IMT and position information of the enlargement region ER to the album editing unit 36.

The position information of the enlargement target image IMT is information indicating which image IM of the image display cell CE in the album page 14 has been selected as the enlargement target image IMT. Specifically, the position information of the enlargement target image IMT is address information indicating the row and column in which the image display cell CE of the image IM selected as the enlargement target image IMT is located. Likewise, the position information of the enlargement region ER is address information of the image display cell CE that overlaps the trajectory TR of the finger F.

FIG. 9 illustrates a state where the image IM in the image display cell CE in the third row from the top and the second column from the left in the album page 14 is selected as an enlargement target image IMT and the image display cells CE to the image display cell CE in the third row from the top and the fourth column from the left are designated as an enlargement region ER. In this case, the image IM in the image display cell CE in the third row from the top and the third column from the left and the image IM in the image display cell CE in the third row from the top and the fourth column from the left are deleted images IMD (see FIG. 10A).

The album editing unit 36 recognizes which image IM is the enlargement target image IMT on the basis of the position information of the enlargement target image IMT. That is, the album editing unit 36 executes, as an album editing process, a recognition process of recognizing the enlargement target image IMT. In addition, the album editing unit 36 grasps, on the basis of the position information of the enlargement region ER, how many unit cells UCE correspond to the enlargement region ER and which shape the enlargement region ER has.

FIG. 10A illustrates a state before an enlargement process in the example in FIG. 9, and FIG. 10B illustrates a state after the enlargement process. In FIG. 10A, the image display cell CE of the enlargement target image IMT remains a square-shaped unit cell UCE. On the other hand, in FIG. 10B, the enlargement target image IMT after the enlargement process, that is, the image display cell CE of the enlarged image IME (the enlargement region ER), corresponds to three unit cells UCE and is a laterally-long rectangle. In FIG. 10B, the image IM arranged in the image display cell CE in the third row from the top and the third column from the left and the image IM arranged in the image display cell CE in the third row from the top and the fourth column from the left in FIG. 10A have been deleted through a deletion process executed by the album editing unit 36. When the undo button 15 is selected in FIG. 10B, the state returns to the state before the enlargement process in FIG. 10A.

FIG. 11 illustrates the details of the enlargement process in the example in FIG. 9 and FIGS. 10A and 10B. First, in step ST10, the album editing unit 36 enlarges the enlargement target image IMT such that the length in the row direction of the enlargement target image IMT matches the length in the row direction of the enlargement region ER as a new image display cell CE, thereby creating an enlarged image IME, as in step ST1 in FIG. 5. That is, the album editing unit 36 enlarges the image IM recognized as the enlargement target image IMT in accordance with the size of the enlargement region ER for which the number of corresponding unit cells UCE has been grasped.

Subsequently, in step ST20, the image display cell CE (the enlargement region ER) is placed at the center portion of the enlarged image IME, as in step ST2 in FIG. 5. Subsequently, in step ST30, the upper and lower edge portions (hatched portions) of the enlarged image IME other than the center portion at which the image display cell CE is placed are trimmed away, as in step ST3 in FIG. 5. Finally, in step ST40, the image display cell CE in which the trimmed enlarged image IME is displayed is arranged at the position corresponding to the enlargement region ER in the album page 14, as in step ST4 in FIG. 5.

Figure 12:
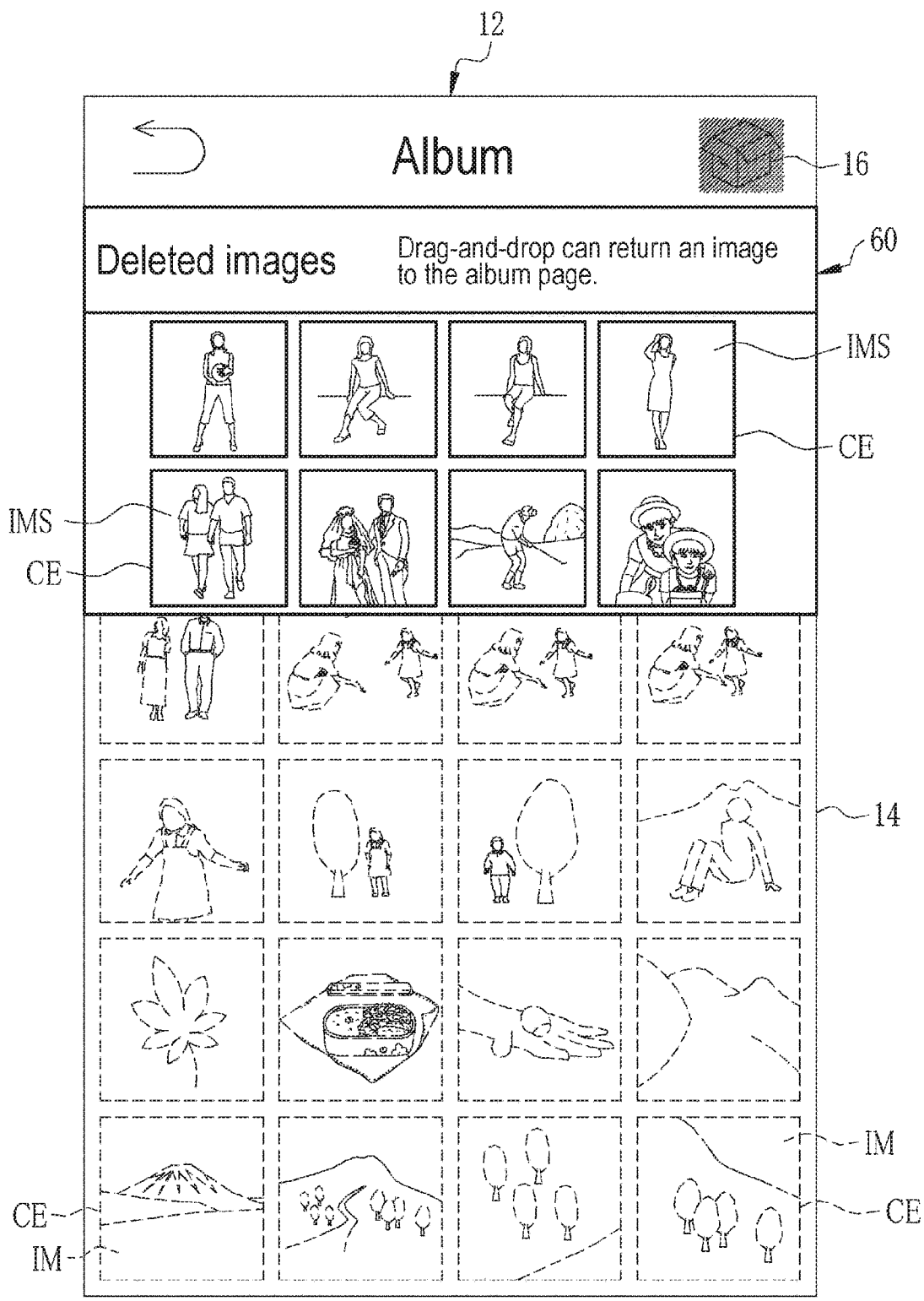
FIG. 12 is a diagram illustrating a state where an identical-attribute image list is displayed on the album screen.

In FIG. 12, when the list display button 16 is selected by the finger F as indicated by hatching, the list display processing unit 44 displays the identical-attribute image list 60 together with the album page 14. That is, the selection of the list display button 16 corresponds to an instruction to display the identical-attribute image list 60.

On the identical-attribute image list 60, the image display cell CE of an identical-attribute image IMS is displayed. In a case where there are a plurality of identical-attribute images IMS, the list display processing unit 44 displays the image display cells CE of the identical-attribute images IMS on the identical-attribute image list 60 by arranging them, as illustrated. The display order is the same as in the album page 14, for example, in the order from the image IM of the oldest shooting date and time to the image IM of the newest shooting date and time from the top to the bottom and from the left to the right. While the identical-attribute image list 60 is displayed, the images IM and the image display cells CE in the album page 14 are grayed out as indicated by broken lines.

When the list display button 16 is selected again in a state where the identical-attribute image list 60 is displayed, the list display processing unit 44 executes a list hiding process of hiding the identical-attribute image list 60. That is, the second selection of the list display button 16 corresponds to an instruction to hide the identical-attribute image list 60.

Figure 13:
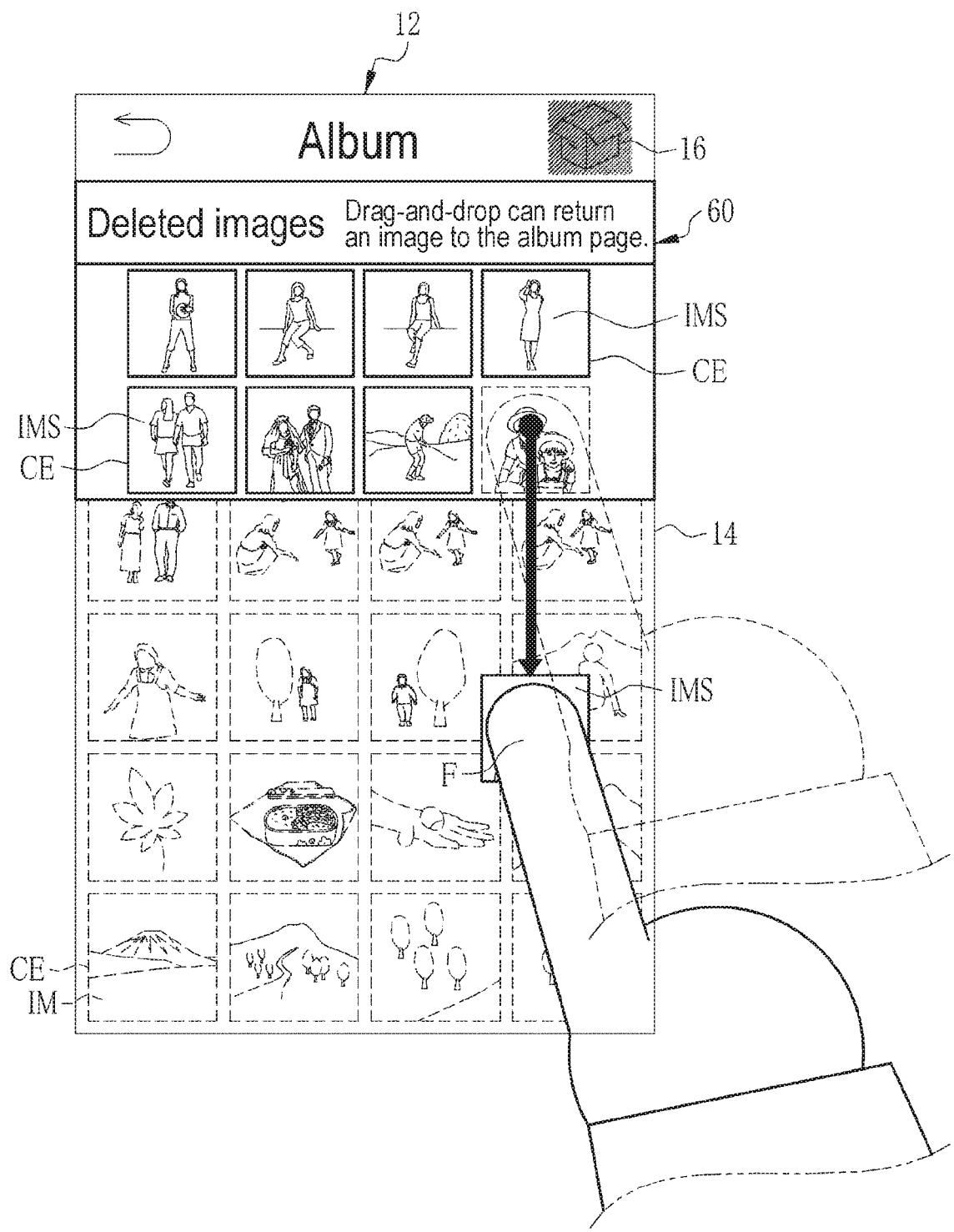
FIG. 13 is a diagram illustrating a state where an identical-attribute image in the identical-attribute image list is dragged and dropped on the album page.

As illustrated in FIG. 13, a return instruction is a gesture instruction of touching a desired image display cell CE on the identical-attribute image list 60 with the finger F and moving the finger F to the album page 14 while maintaining that state (a drag-and-drop instruction). When the return instruction is provided, the return processing unit 42 executes a return process of returning the identical-attribute image IMS displayed in the image display cell CE touched by the finger F to the original position in the album page 14.

On the contrary, when a drag-and-drop instruction to move an image display cell CE in the album page 14 to the identical-attribute image list 60 is provided, the album editing unit 36 executes a deletion process on the image IM displayed in the image display cell CE for which the drag-and-drop instruction has been provided. That is, in the display state illustrated in FIG. 12, an image IM can be moved between the album page 14 and the identical-attribute image list 60. Note that the image IM displayed in the image display cell CE for which the drag-and-drop instruction has been provided in the album page 14 is also handled as a deleted image IMD.

In FIG. 14, the album management information 31 includes information about images IM displayed on the album page 14 and information about deleted images IMD. In the case of the images IM displayed on the album page 14, image IDs and layout information are stored in association with each other. On the other hand, in the case of the deleted images IMD, only image IDs are stored.

The layout information is constituted by address information, trimming position information, and the like. The address information indicates the row and column in which the image display cell CE of the image IM is arranged in the album page 14.

Figure 15:
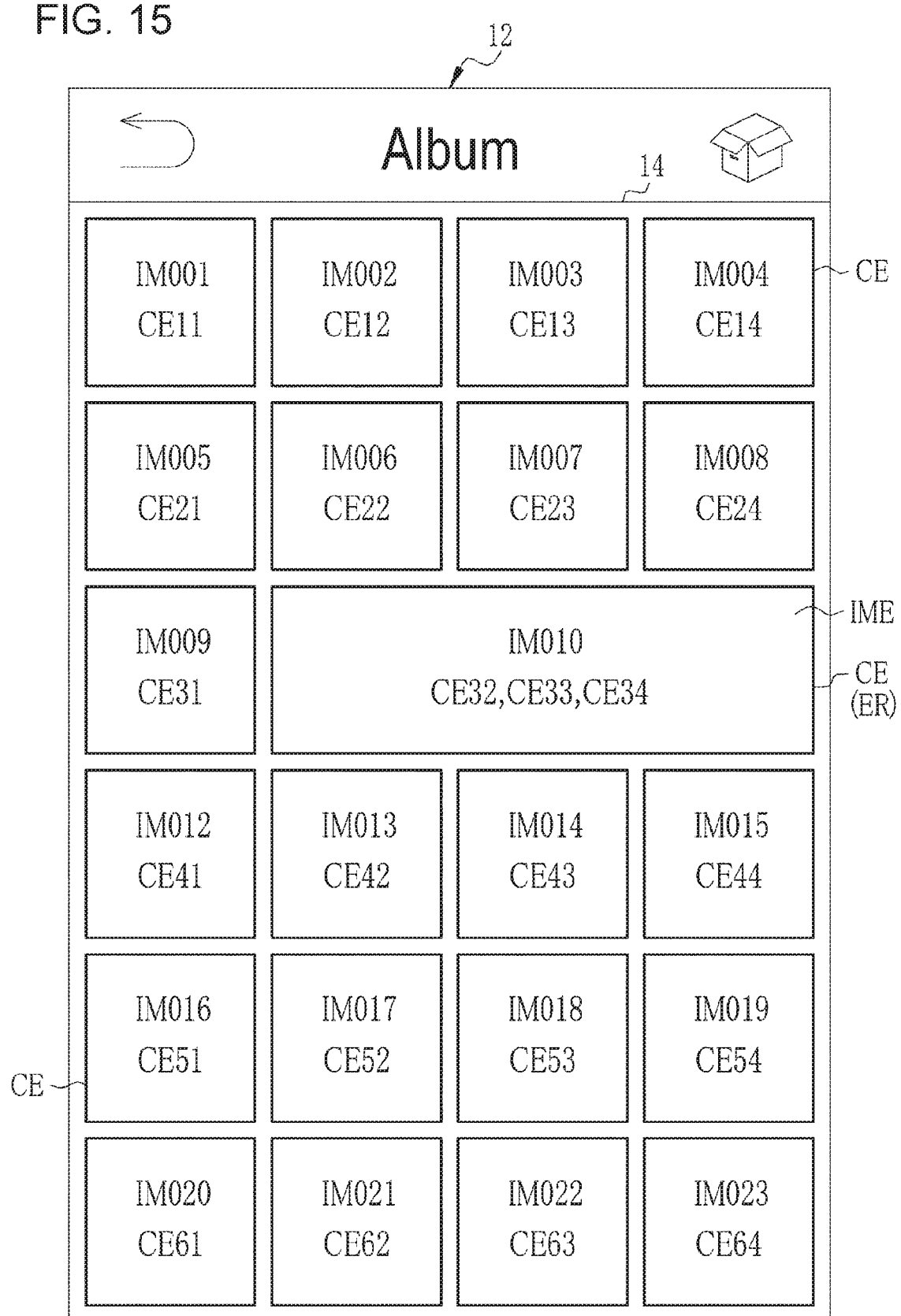
FIG. 15 is a diagram illustrating the album screen in which an image ID and address information are written in each image display cell.

The address information is a combination of characters "CE" and a two-digit number, such as CE11, CE12, CE13, and the like. As illustrated in FIG. 15, in the two-digit number, the first digit represents a row in the album page 14 and the second digit represents a column in the album page 14. For example, the address information of the image display cell CE in the second row from the top and the third column from the left in the album page 14 is CE23.

With reference to the address information, the size and shape of the image display cell CE for displaying the image IM can be grasped. Specifically, among the images IM displayed on the album page 14, the image IM having only one piece of address information stored is an image IM displayed in a square-shaped unit cell UCE. On the other hand, the image IM having a plurality of pieces of address information stored is an enlarged image IME in the image display cell CE which is an enlargement region ER formed by combining the unit cells UCE indicated by the pieces of address information. That is, the address information of the enlarged image IME is the position information of the enlargement target image IMT and the position information of the enlargement region ER that are output from the instruction receiving unit 35 to the album editing unit 36.

For example, for the image IM whose image ID is IM010, pieces of address information CE32, CE33, and CE34 are stored. Thus, it is understood from FIG. 15 that the image display cell CE of the image IM of IM010 is a rectangle-shaped enlargement region ER illustrated also in FIG. 10B, formed by combining in the row direction three unit cells UCE in the third row from the top and the second to fourth columns from the left.

Figure 16:
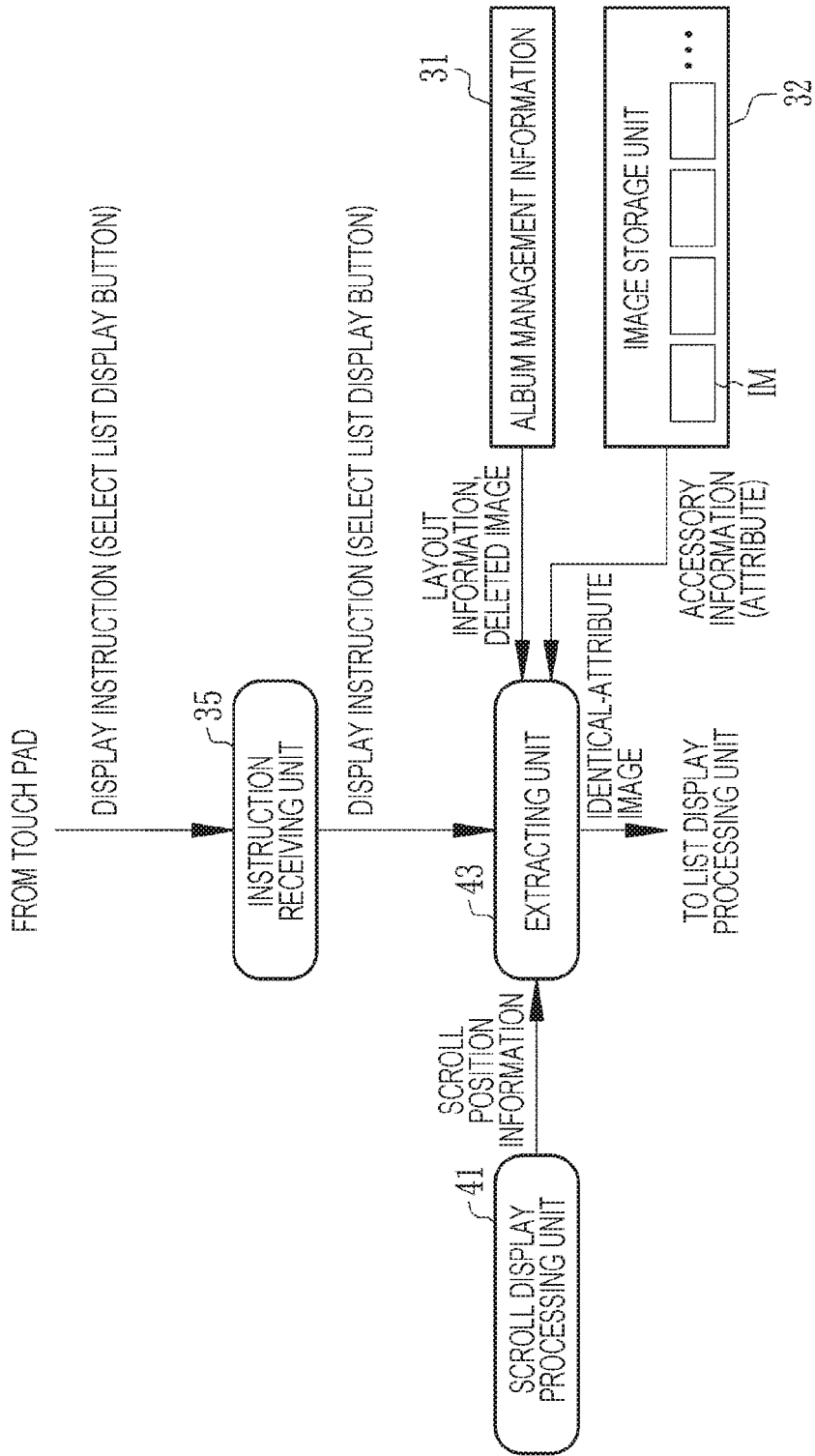
FIG. 16 is a diagram illustrating a state of an extraction process.

As illustrated in FIG. 16, the instruction receiving unit 35 receives a selection of the list display button 16 as an instruction to display the identical-attribute image list 60. The instruction receiving unit 35 outputs the received display instruction to the extracting unit 43.

In response to receipt of the display instruction from the instruction receiving unit 35, the extracting unit 43 causes the scroll display processing unit 41 to output scroll position information. The scroll position information is information indicating a current position of scroll display of the album page 14. On the basis of the scroll position information, and the address information of the images IM displayed on the album page 14 in the album management information 31, the extracting unit 43 grasps the images IM present in the album page 14 at the current position of scroll display. In addition, the extracting unit 43 grasps the deleted images IMD on the basis of the image IDs of the deleted images IMD in the album management information 31.

The extracting unit 43 reads out, from the image storage unit 32, the accessory information of the images IM present in the album page 14 at the current position of scroll display and the accessory information of the deleted images IMD, and grasps the attributes thereof. Subsequently, the extracting unit 43 extracts, from among the deleted images IMD, an identical-attribute image IMS whose attribute is identical to that of an image IM present in the album page 14 at the current position of scroll display.

Figure 17:
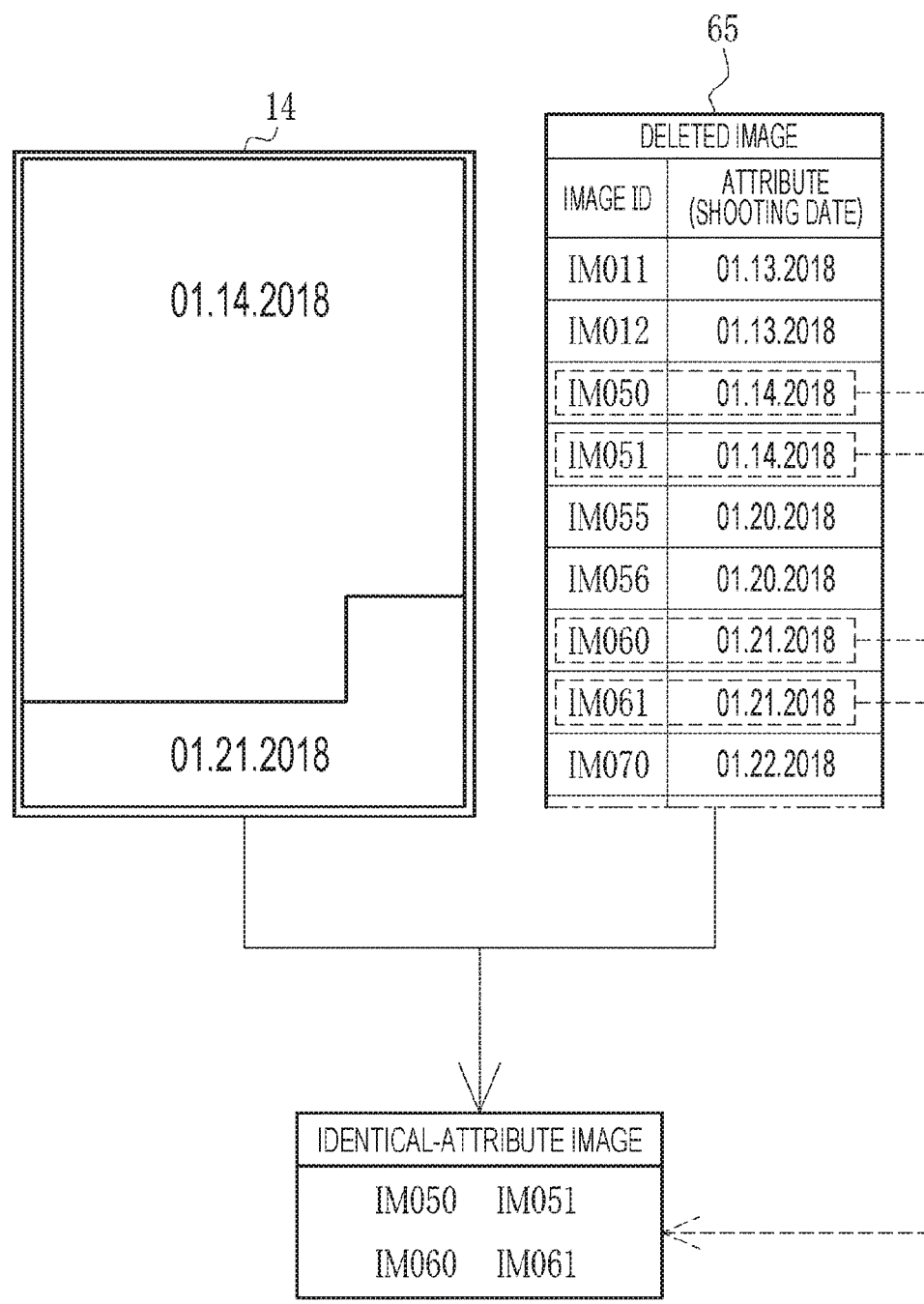
FIG. 17 is a diagram illustrating an extraction process in a case where an attribute is a shooting date in a shooting date and time.

FIG. 17 illustrates an example of a case where the shooting date and time is selected to set the display order of the images IM in the album page 14 and the shooting date in the shooting date and time is used as an attribute. In a case where the shooting dates of the images IM present in the album page 14 at the current position of scroll display are 01.14.2018 and 01.21.2018 and the shooting dates of the deleted images IMD are those shown in a table 65, the extracting unit 43 extracts, as identical-attribute images IMS, the deleted images IMD whose image IDs are IM050 and IM051 and whose shooting dates are 01.14.2018 and the deleted images IMD whose image IDs are IM060 and IM061 and whose shooting dates are 01.21.2018.

Figure 18:
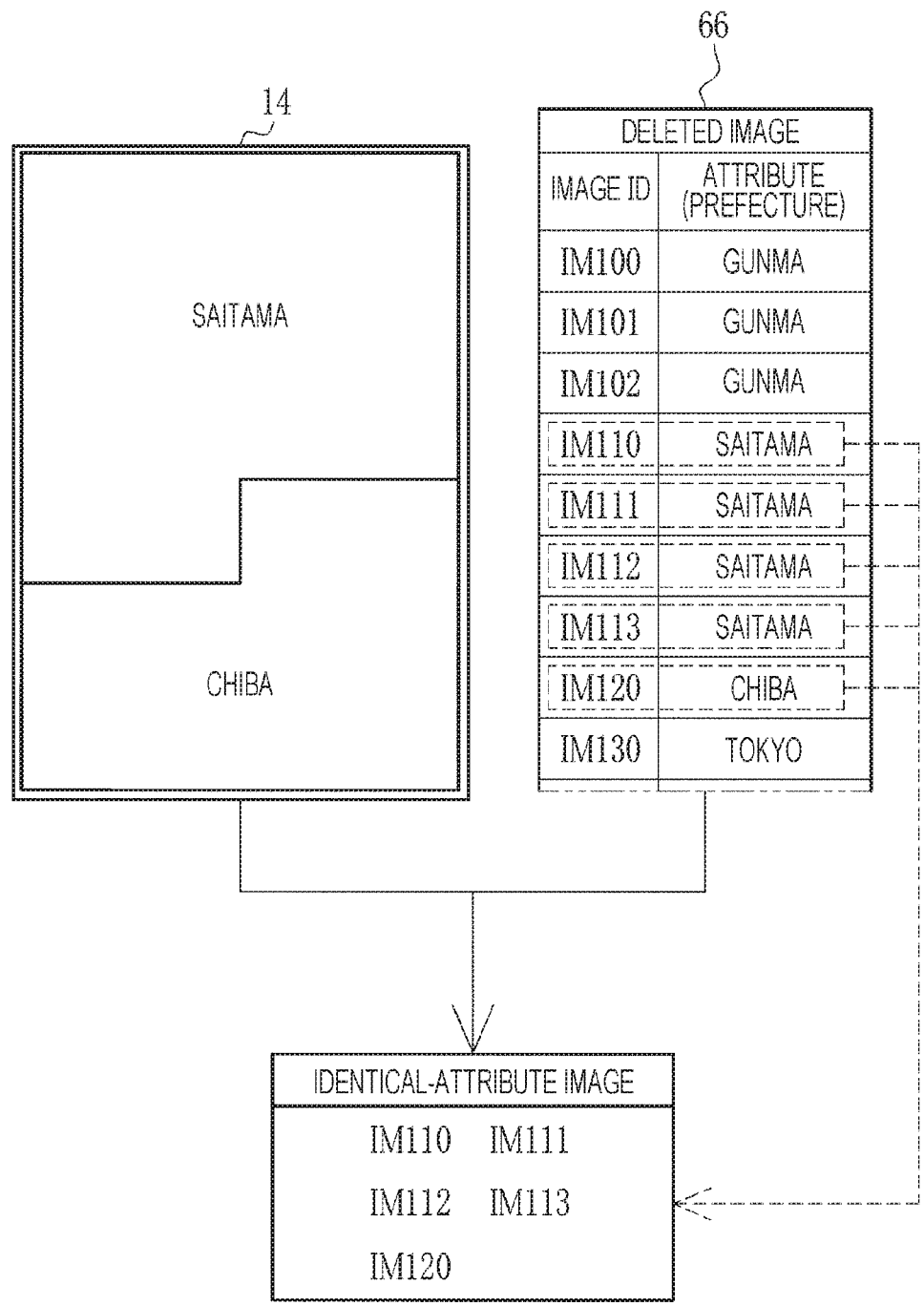
FIG. 18 is a diagram illustrating an extraction process in a case where an attribute is prefecture in a shooting location.

FIG. 18 illustrates an example of a case where the shooting location is selected to set the display order of the images IM in the album page 14 and prefecture in the shooting location is used as an attribute. In a case where the prefectures in the shooting locations of the images IM present in the album page 14 at the current position of scroll display are Saitama and Chiba and the prefectures in the shooting locations of the deleted images IMD are those shown in a table 66, the extracting unit 43 extracts, as identical-attribute images IMS, the deleted images IMD whose image IDs are IM110, IM111, IM112, and IM113 and whose shooting locations are Saitama and the deleted image IMD whose image ID is IM120 and whose shooting location is Chiba.

FIG. 9 to FIG. 11 illustrate an example in which the unit cells UCE are combined in the row direction to perform enlarged display in response to an enlargement instruction of linearly moving the finger F in the row direction. However, as illustrated in FIG. 19A to FIG. 24B, variation in enlargement instruction and enlarged display is not limited to the example in FIG. 9 to FIG. 11.

FIGS. 19A and 19B illustrate an example in which enlarged display is performed by combining unit cells UCE not in the row direction but in the column direction in response to an enlargement instruction of linearly moving the finger F not in the row direction but in the column direction. As indicated by a trajectory TR in FIG. 19A, the enlargement instruction is provided by moving the finger F in the column direction from the image display cell CE of the image IM whose image ID is IM004 and whose address information is CE14 to the image display cell CE of the image IM whose image ID is IM016 and whose address information is CE44. In this case, as illustrated in FIG. 19B, the image IM whose image ID is IM004, which is an enlargement target image IMT, is displayed in an enlarged view in an enlargement region ER that is formed by combining the image display cells CE of CE14, CE24, CE34, and CE44 in the column direction.

In FIGS. 19A and 19B, the images IM that are displayed in the image display cells CE of CE24, CE34, and CE44 and whose image IDs are IM008, IM012, and IM016 are deleted images IMD.

Figures 20A, 20B:
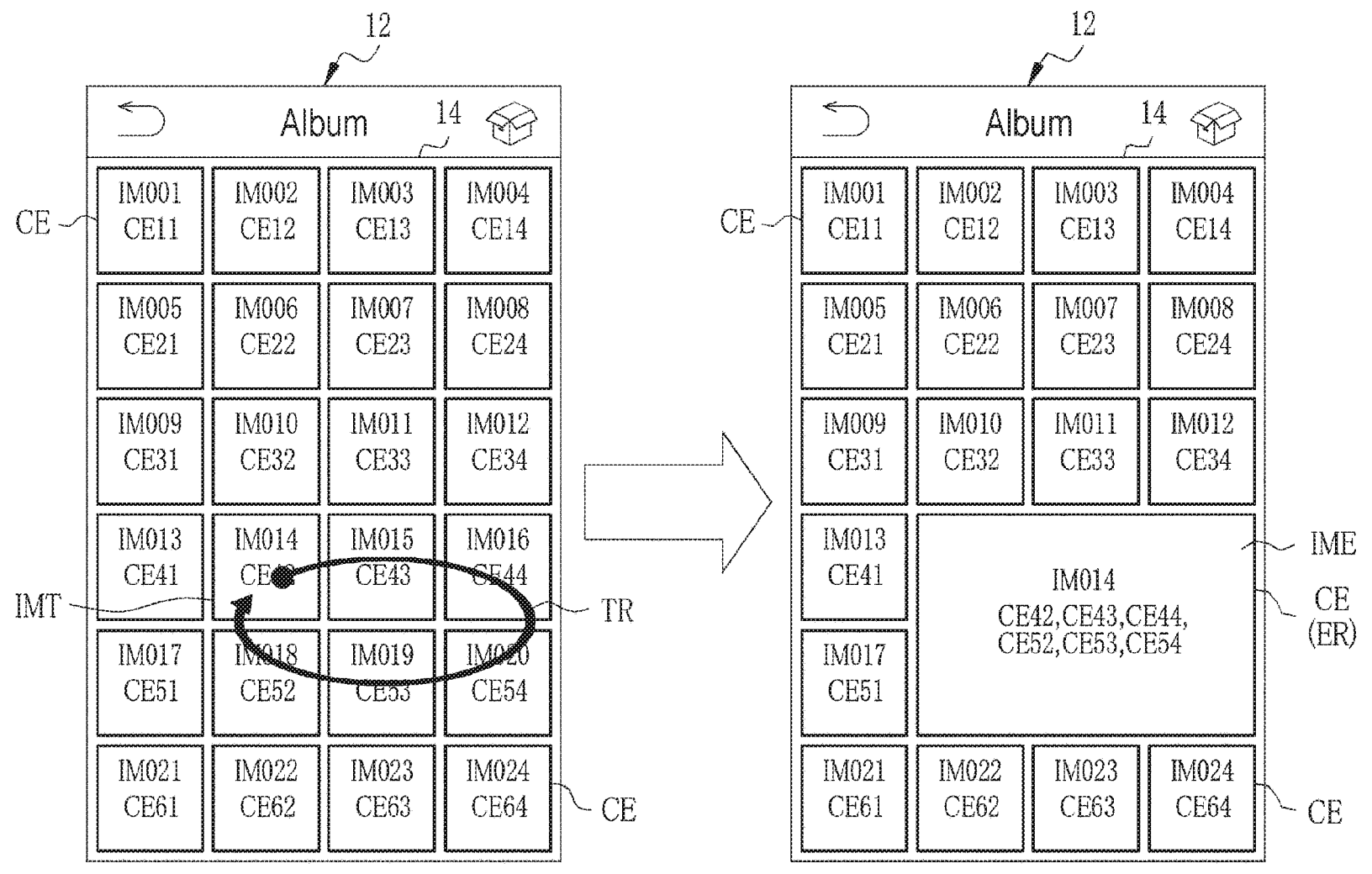

FIGS. 20A and 20B illustrate an example in which enlarged display is performed by combining unit cells UCE over a plurality of rows and a plurality of columns, not in only one row or only one column, in response to an enlargement instruction of moving the finger F over a plurality of rows and a plurality of columns, not in only one row or only one column. As indicated by a trajectory TR in FIG. 20A, the enlargement instruction is provided by moving the finger F to draw an oval clockwise starting from the image display cell CE of the image IM whose image ID is IM014 and whose address information is CE42 and returning to the image display cell CE of the image IM whose image ID is IM014 via the image display cells CE of CE43, CE44, CE54, CE53, and CE52. In this case, as illustrated in FIG. 20B, the image IM whose image ID is IM014, which is an enlargement target image IMT, is displayed in an enlarged view in an enlargement region ER that is formed by combining the image display cells CE of CE42, CE43, CE44, CE52, CE53, and CE54 in matrix directions.

In FIGS. 20A and 20B, the images IM that are displayed in the image display cells CE of CE43, CE44, CE52, CE53, and CE54 and whose image IDs are IM015, IM016, IM018, IM019, and IM020 are deleted images IMD.

FIGS. 21A and 21B illustrate an example in which an enlargement instruction and enlarged display are performed a plurality of times within the album page 14. FIG. 21A illustrates, like FIG. 20B, a state where the image IM whose image ID is IM014 is displayed in an enlarged view in the enlargement region ER that is formed by combining the image display cells CE of CE42, CE43, CE44, CE52, CE53, and CE54 in the matrix directions. Also illustrated is, as indicated by a trajectory TR, a case where an enlargement instruction is provided by moving the finger F to draw a circle clockwise starting from the image display cell CE of the image IM whose image ID is IM001 and whose address information is CE11 and returning to the image display cell CE of the image IM whose image ID is IM001 via the image display cells CE of CE12, CE22, and CE21. In this case, as illustrated in FIG. 21B, the image IM whose image ID is IM001, which is an enlargement target image IMT, is displayed in an enlarged view in an enlargement region ER that is formed by combining the image display cells CE of CE11, CE12, CE21, and CE22 in the matrix directions.

In FIGS. 21A and 21B, the images IM that are displayed in the image display cells CE of CE12, CE21, and CE22 and whose image IDs are IM002, IM005, and IM006 are deleted images IMD.

FIGS. 22A and 22B illustrate an example in which an enlarged image IME is designated as an enlargement target image IMT. As indicated by a trajectory TR in FIG. 22A, an enlargement instruction is provided by moving the finger F to draw an oval clockwise starting from the image display cell CE of the enlarged image IME whose image ID is IM014 and whose pieces of address information are CE42, CE43, CE44, CE52, CE53, and CE54 and returning to the image display cell CE of the image IM whose image ID is IM014 via the image display cells CE of CE64, CE63, and CE62. In this case, as illustrated in FIG. 22B, the image IM whose image ID is IM014, which is an enlarged image IME and is an enlargement target image IMT, is displayed in an enlarged view in an enlargement region ER that is formed by combining the image display cells CE of CE42, CE43, CE44, CE52, CE53, CE54, CE62, CE63, and CE64 in the matrix directions.

In FIGS. 22A and 22B, the images IM that are displayed in the image display cells CE of CE62, CE63, and CE64 and whose image IDs are IM022, IM023, and IM024 are deleted images IMD.

Figure 23A:
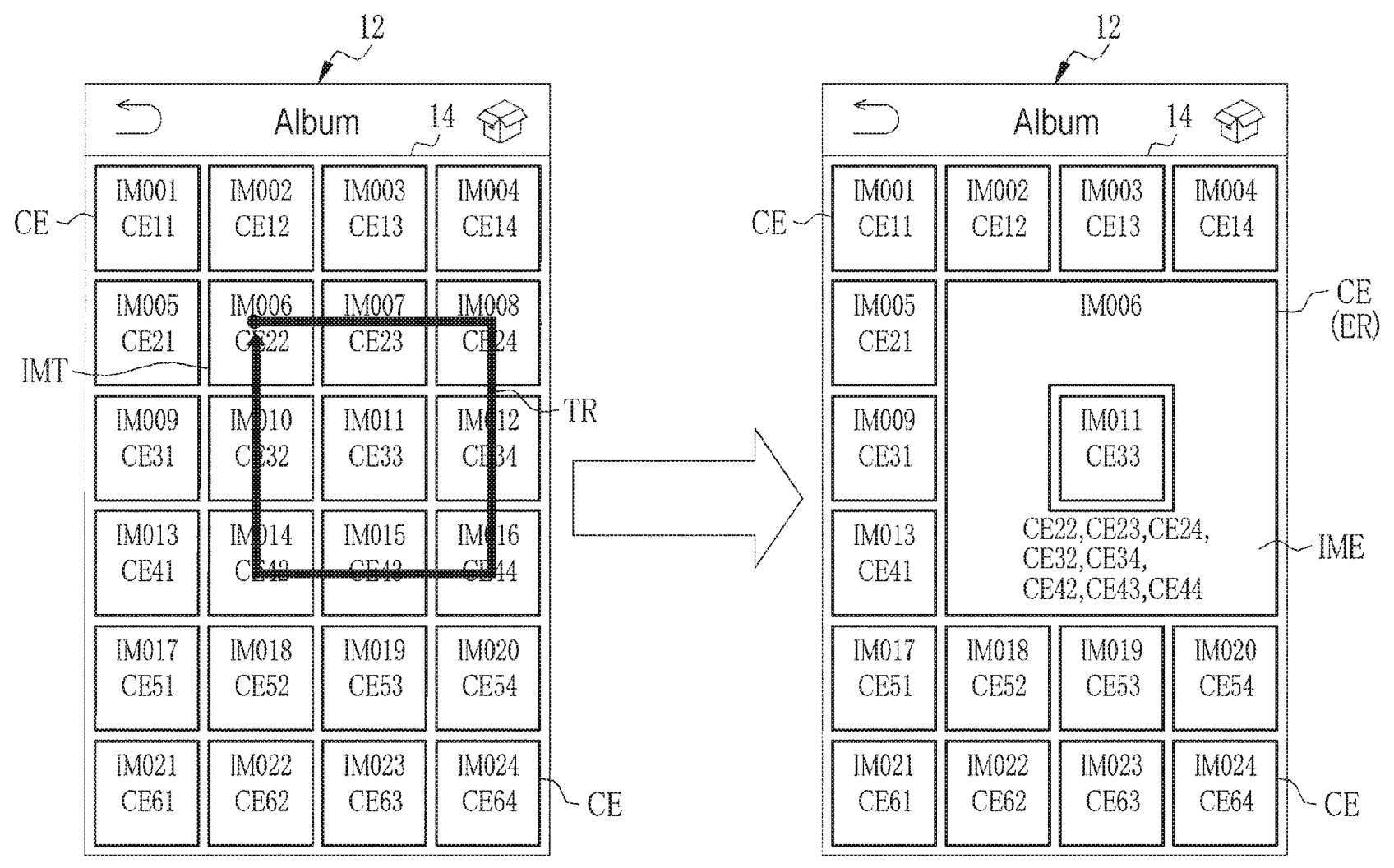

FIGS. 23A and 23B illustrate an example of a case where the finger F is moved along image display cells CE to draw a loop. As indicated by a trajectory TR in FIG. 23A, an enlargement instruction is provided by moving the finger F to draw a square clockwise starting from the image display cell CE of the image IM whose image ID is IM006 and whose address information is CE22 and returning to the image display cell CE of the image IM whose image ID is IM006 via the image display cells CE of CE23, CE24, CE34, CE44, CE43, CE42, and CE32. That is, the finger F is moved along the eight image display cells CE surrounding the image display cell CE of CE33 to draw a loop. In this case, as illustrated in FIG. 23B, the image IM whose image ID is IM006, which is an enlargement target image IMT, is displayed in an enlarged view in a loop-shaped enlargement region ER that is formed by combining the image display cells CE of CE22, CE23, CE24, CE32, CE34, CE42, CE43, and CE44 in the matrix directions.

In FIGS. 23A and 23B, the images IM that are displayed in the image display cells CE of CE23, CE24, CE32, CE34, CE42, CE43, and CE44 and whose image IDs are IM007, IM008, IM010, IM012, IM014, IM015, and IM016 are deleted images IMD.

Figure 24B:
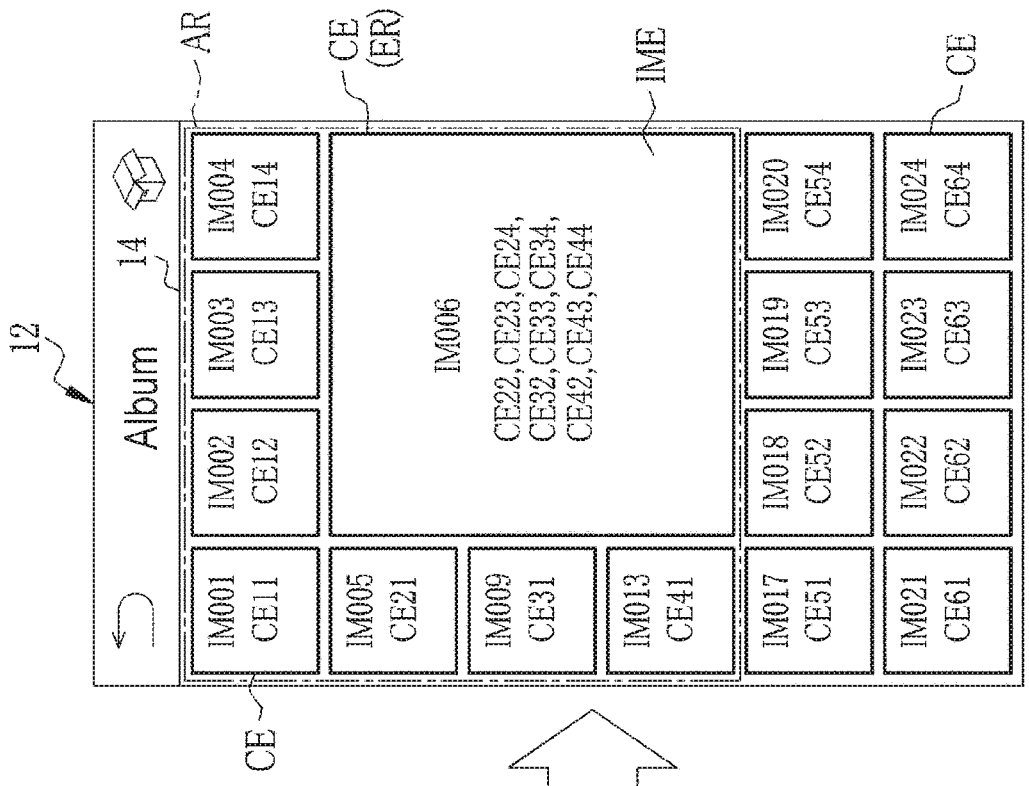
Figure 24A:
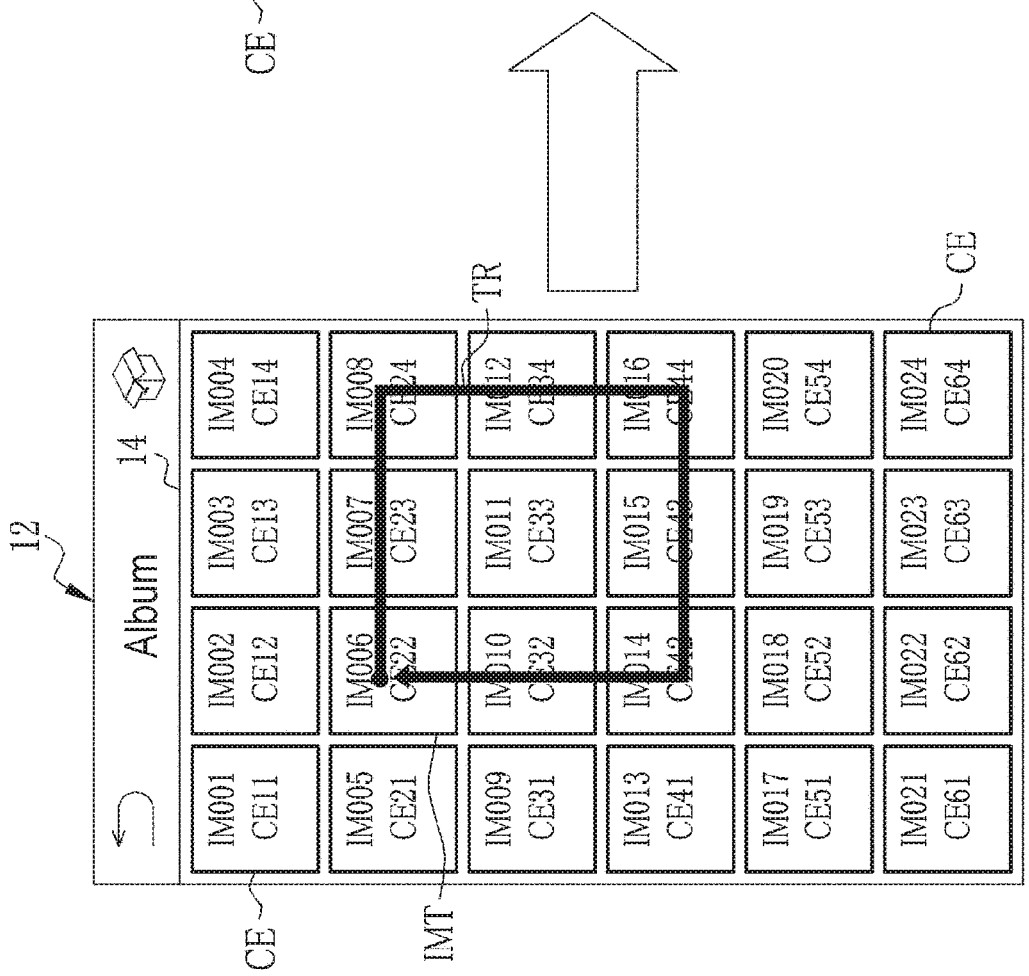
Figure 25:
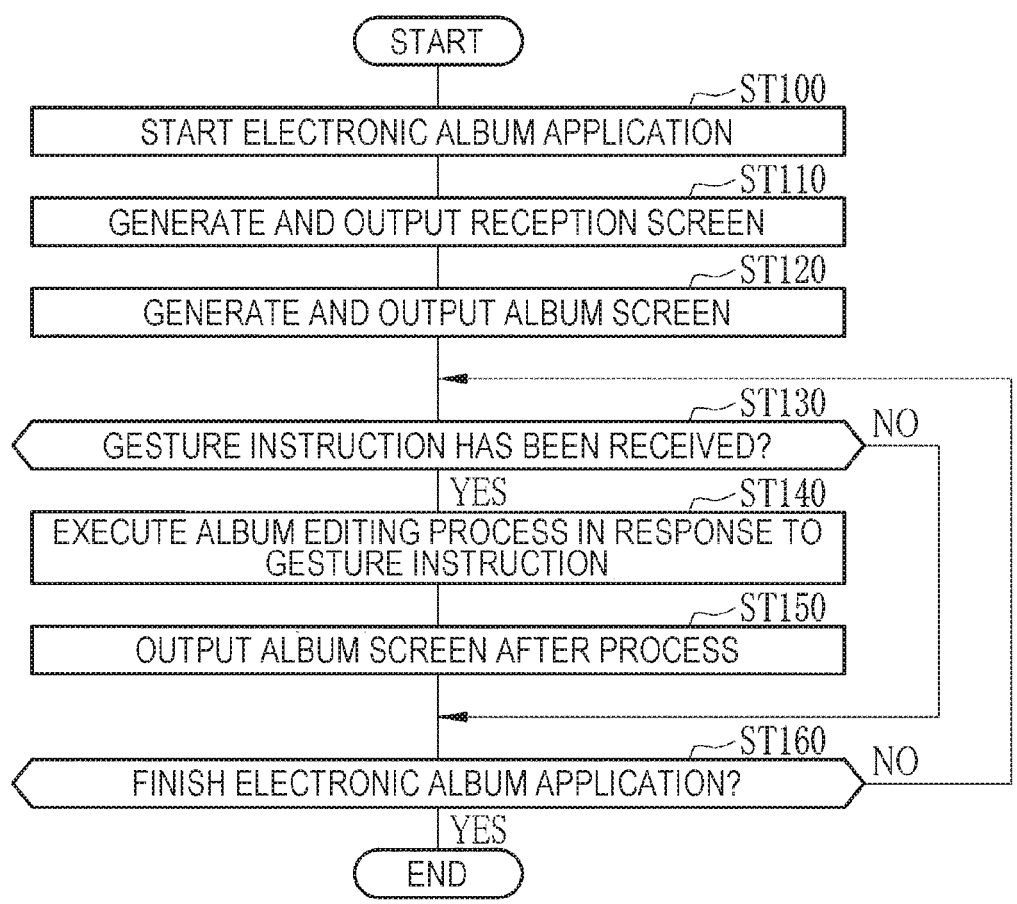
FIG. 25 is a flowchart illustrating a process procedure of the smartphone functioning as an electronic album apparatus.
Figure 26:
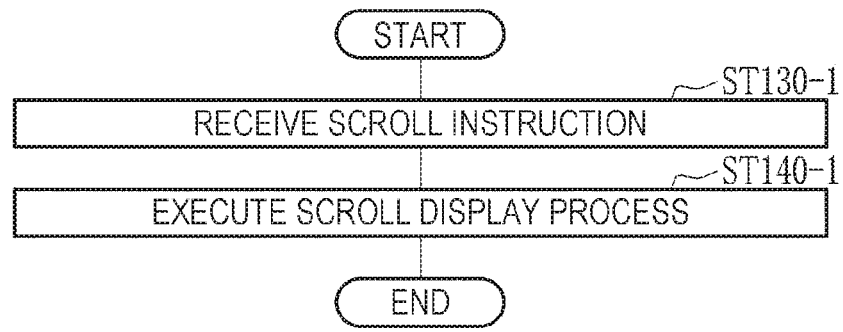
FIG. 26 is a flowchart illustrating a process procedure of the smartphone in a case where a scroll instruction is received.

FIGS. 24A and 24B illustrate another example of a case where the finger F is moved along image display cells CE to draw a loop, as in FIGS. 23A and 23B. In FIGS. 23A and 23B, the enlargement region ER is a loop-shaped region, but FIGS. 24A and 24B are different. That is, as illustrated in FIG. 24B, the image IM whose image ID is IM006, which is an enlargement target image IMT, is displayed in an enlarged view in a square-shaped enlargement region ER that is formed by combining the image display cells CE of CE22, CE23, CE24, CE32, CE33, CE34, CE42, CE43, and CE44 in the matrix directions.

In FIGS. 24A and 24B, the images IM that are displayed in the image display cells CE of CE23, CE24, CE32, CE33, CE34, CE42, CE43, and CE44 and whose image IDs are IM007, IM008, IM010, IM011, IM012, IM014, IM015, and IM016 are deleted images IMD.

Either the mode illustrated in FIGS. 23A and 23B or the mode illustrated in FIGS. 24A and 24B may be adopted. Both the modes illustrated in FIGS. 23A and 23B and FIGS. 24A and 24B may be adopted and switched therebetween in accordance with a selection by the user 11.

As described above, there are variations in enlargement instruction and enlarged display. Thus, an enlargement region ER may have a shape suitable for an image IM, for example, the enlargement region ER may be long in the row direction for an image IM of mountains taken in a panoramic view, or may be long in the column direction for an image IM of a vertically long building taken in a skyward direction.

Although not illustrated, an enlarged image IME may become a deleted image IMD depending on an enlargement instruction.

The album editing process executed by the album editing unit 36 is not limited to the above-described processes. For example, the album editing process may be a process of changing the display order of image display cells CE in the album page 14, a process of displaying an image IM in the album page 14 in an enlarged view on the entire display 25, or the like.

The process of changing the display order of image display cells CE is executed in response to, for example, a gesture instruction to select the image display cell CE of a desired image IM by using the finger F, display a dialog provided with an option of permitting change of the display order of the image display cell CE, and select the option in the dialog. Also, the process of displaying an image IM in the album page 14 in an enlarged view on the entire display 25 is executed in response to a gesture instruction to select the image display cell CE of a desired image IM by using the finger F, display a dialog provided with an option of displaying the image IM in an enlarged view on the entire display 25, and select the option in the dialog. The user 11 displays a desired image IM in an enlarged view, deletes an unnecessary image IM, or changes the display order of image display cells CE, thereby arranging the images IM in the album page 14 in accordance with his/her preferences.

As representatively illustrated in FIG. 24B, the user 11 is able to designate an electronic album region AR, which is a rectangular region in the album page 14 that is currently displayed on the album screen 12 and store the designated electronic album region AR as a new image IM in the image storage unit 32 or set the image IM as a standby image of the smartphone 10. In addition, the electronic album region AR can be transmitted to a print order reception server on the network 27 so as to be printed.

The electronic album region AR has a row-direction width that is fixed as in the album page 14 and has a column-direction width that is variable. In addition, the electronic album region AR can be moved in the column direction in units of unit cells UCE.

Next, the function of the smartphone 10 having the above-described configuration will be described with reference to the flowcharts in FIG. 25 to FIG. 29. First, in step ST100 in FIG. 25, upon startup of the electronic album application 30, the instruction receiving unit 35 and the album editing unit 36 are established in the CPU 22 as illustrated in FIG. 3. Accordingly, the smartphone 10 functions as an electronic album apparatus.

After the startup of the electronic album application 30, a reception screen is generated by the screen generating unit 40 and is output to the display 25 (step ST110). In a case where no particular designation is given on the reception screen, all the images IM are read out from the image storage unit 32 by the album editing unit 36 and are arranged in the album page 14. On the other hand, in a case where an attribute is designated on the reception screen, images IM having the designated attribute are searched for in the image storage unit 32 by the album editing unit 36, and the images IM obtained through the search are arranged in the album page 14. In this way, the album screen 12 including the album page 14 in which a plurality of images IM are arranged is generated by the screen generating unit 40 and is output to the display 25 as illustrated in FIG. 1 and so forth (step ST120, a screen generation step). As illustrated in FIG. 4, the positions of the images IM arranged in the album page 14 are determined in accordance with the setting of the display order that is based on an attribute, and the individual images IM are arranged at the determined positions of the album page 14.

The instruction receiving unit 35 waits for a gesture instruction (step ST130). When a gesture instruction is received by the instruction receiving unit 35 (YES in step ST130, an instruction reception step), the album editing unit 36 executes an album editing process in response to the gesture instruction (step ST140, an album editing process). Subsequently, the album editing unit 36 outputs the album screen 12 that has undergone the album editing process to the display 25 (step ST150). The series of steps ST130 to ST150 are repeated until the electronic album application 30 is finished (YES in step ST160).

FIG. 26 to FIG. 29 each describe an album editing process executed in response to a gesture instruction. First, in FIG. 26, when a flick instruction of flicking the inside of the album page 14 in an up-down direction with the finger F is received as a scroll instruction by the instruction receiving unit 35 (step ST130-1, an instruction reception step), the scroll display processing unit 41 executes a scroll display process as illustrated in FIGS. 8A and 8B (step ST140-1, an album editing step).

Figure 27:
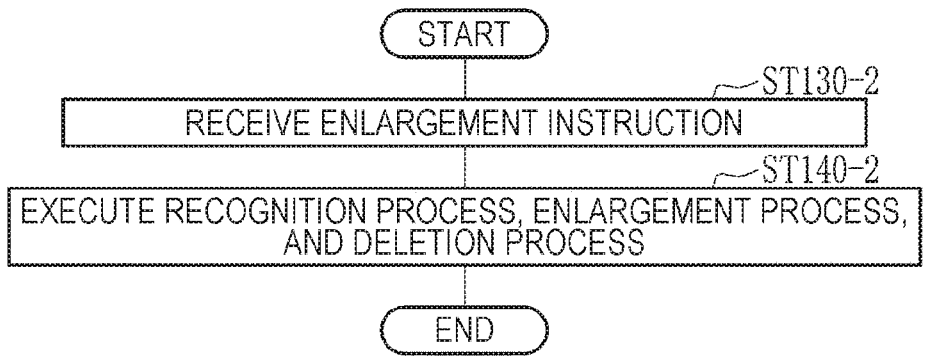
FIG. 27 is a flowchart illustrating a process procedure of the smartphone in a case where an enlargement instruction is received.

In FIG. 27, when a swipe instruction of moving one finger F of the user 11 within the album page 14 is received as an enlargement instruction by the instruction receiving unit 35 (step ST130-2, an instruction reception step), the album editing unit 36 executes a recognition process, an enlargement process, and a deletion process for an enlargement target image IMT as illustrated in FIGS. 10A and 10B and FIG. 11 (step ST140-2, an album editing step). More specifically, an enlarged image IME is displayed in an enlarged view in an enlargement region ER. In addition, an image IM that overlaps the enlargement region ER is deleted from the album page 14.

Figure 28:
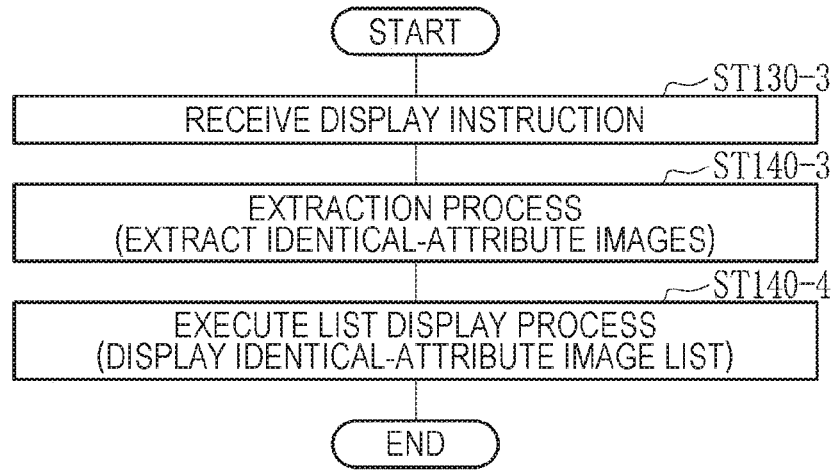
FIG. 28 is a flowchart illustrating a process procedure of the smartphone in a case where a display instruction is received.

In FIG. 28, when an instruction of selecting the display button 16 with the finger F is received as a display instruction by the instruction receiving unit 35 (step ST130-3, an instruction reception step), the extracting unit 43 executes an extraction process, and identical-attribute images IMS are extracted from among deleted images IMD on the basis of the attributes of the images IM present in the album page 14 at the current position of scroll display and the attributes of the deleted images IMD, as illustrated in FIG. 16 to FIG. 18 (step ST140-3, an album editing step). Subsequently, as illustrated in FIG. 12, the list display processing unit 44 executes a list display process, and the identical-attribute image list 60 is displayed together with the album page 14 (step ST140-4, an album editing step).

Figure 29:
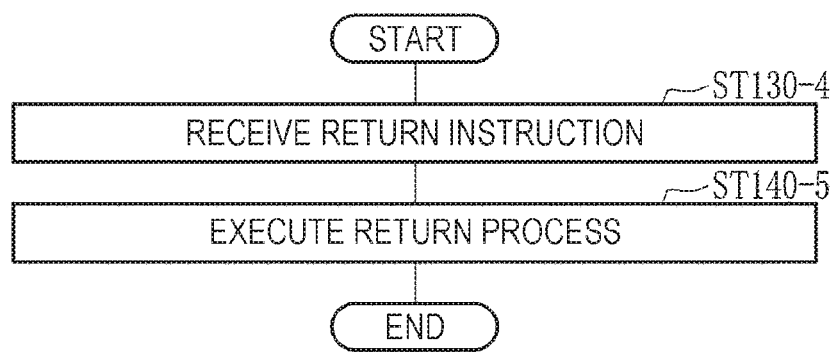
FIG. 29 is a flowchart illustrating a process procedure of the smartphone in a case where a return instruction is received.

In FIG. 29, when a drag-and-drop instruction of touching a desired image display cell CE in the identical-attribute image list 60 with the finger F and moving the finger F to the album page 14 while maintaining the state is received as a return instruction by the instruction receiving unit 35 (step ST130-4, an instruction reception step), the return processing unit 42 executes a return process of returning the identical-attribute image IMS displayed in the image display cell CE touched by the finger F to the original position in the album page 14, as illustrated in FIG. 13 (step ST140-5, an album editing step). When the list display button 16 is selected again in a state where the identical-attribute image list 60 is displayed, the list display processing unit 44 executes a list hiding process, and the identical-attribute image list 60 disappears.

As described above, in the smartphone 10 functioning as an electronic album apparatus, in the case of receiving a return instruction to return a deleted image IMD deleted from the album page 14 to the album page 14 and executing a return process of returning the deleted image IMD to the album page 14 in response to the return instruction, identical-attribute images IMS whose attributes are identical to that of an image IM present in the album page 14 at the current position of scroll display are extracted from among a plurality of deleted images IMD, and the identical-attribute image list 60 is displayed together with the album page 14. Thus, the user 11 is able to easily find a desired deleted image IMD to be returned to the album page 14. Thus, it is possible to return the deleted image IMD once deleted from the album page 14 to the album page 14 without much time or effort.

The album editing unit 36 arranges the images IM in the album page 14 in accordance with a display order that is based on an attribute. Thus, images IM having an identical attribute are placed together in one region, which is preferable in appearance. Accordingly, identical-attribute images IMS can be grouped by attribute to some extent.

In response to a display instruction or a hiding instruction provided by a selection of the list display button 16, switching is performed between display and hiding of the identical-attribute image list 60. Thus, the identical-attribute image list 60 can be displayed only when a deleted image IMD (identical-attribute image IMS) is to be returned to the album page 14. The identical-attribute image list 60 may be displayed all the time, but the display area of the album page 14 is decreased accordingly. Thus, it is preferable to make it possible to switch between display and hiding of the identical-attribute image list 60 in the case of using a mobile information terminal having the display 25 with a relatively small size, such as the smartphone 10, as an electronic album apparatus.

In the album page 14, image display cells CE whose size is changed to a positive integral multiple of a unit cell UCE are arranged in a grid pattern on the basis of unit cells UCE. The enlargement region ER of the enlargement target image IMT is a region having a size that is a positive integral multiple of a unit cell UCE. Thus, images IM can be neatly displayed on the album page 14.

The instruction receiving unit 35 receives, as an enlargement instruction, a swipe instruction of moving one finger F along the enlargement region ER within the album page 14 starting from the enlargement target image IMT. Such a swipe instruction enables a relatively specific instruction to be provided, and is thus particularly effective in the case of using a mobile information terminal having the display 25 with a relatively small size, such as the smartphone 10, as an electronic album apparatus.

Second Embodiment

Figure 30:
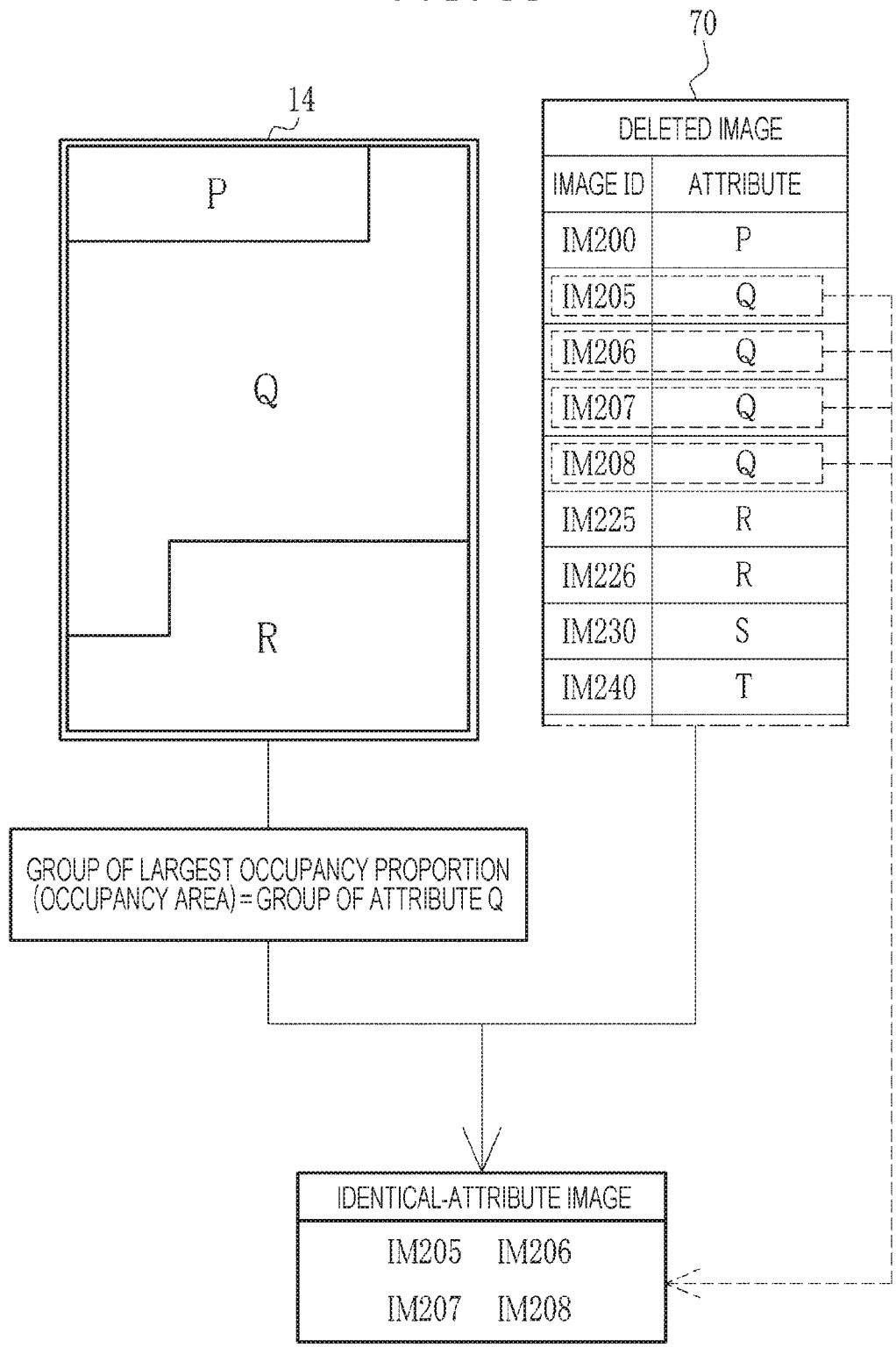
FIG. 30 is a diagram illustrating a state where images of a plurality of groups whose attributes are different from each other are present in the album page and a deleted image whose attribute is identical to that of a group of the largest occupancy area is extracted as an identical-attribute image.
Figure 31:
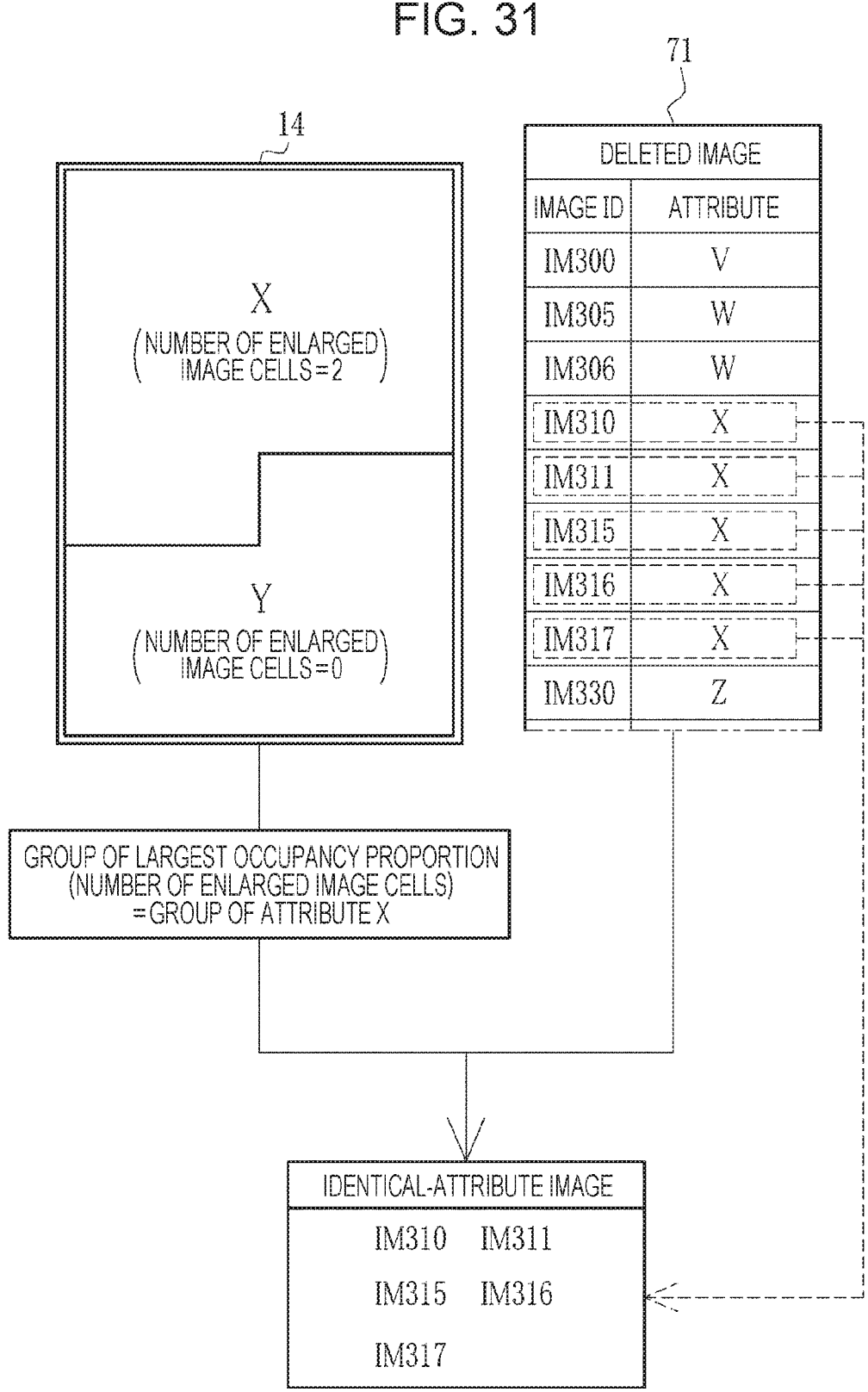
FIG. 31 is a diagram illustrating a state where images of a plurality of groups whose attributes are different from each other are present in the album page and a deleted image whose attribute is identical to that of a group of the largest number of enlarged image cells is extracted as an identical-attribute image.

In a second embodiment illustrated in FIG. 30 and FIG. 31, in a case where images IM of a plurality of groups whose attributes are different from each other are present in the album page 14 at a current position of scroll display, the extracting unit 43 extracts, as an identical-attribute image IMS, a deleted image IMD whose attribute is identical to that of a group of images IM accounting for the largest occupancy proportion in the album page 14.

FIG. 30 illustrates an example of a case where images IM of three groups respectively having attributes P, Q, and R are present in the album page 14 and the images IM of the group having the attribute Q account for the largest occupancy proportion (the largest occupancy area) in the album page 14. In a case where the attributes of the deleted images IMD are those illustrated in a table 70, the extracting unit 43 extracts, as identical-attribute images IMS, the deleted images IMD whose image IDs are IM205, IM206, IM207, and IM208 and whose attributes are identical to the attribute of the group of the largest occupancy proportion. The extracting unit 43 does not extract, as identical-attribute images IMS, the deleted image IMD whose image ID is IM200 and whose attribute is P, and the deleted images IMD whose image IDs are IM225 and IM226 and whose attributes are R.

FIG. 31 illustrates another example of this embodiment. In FIG. 30, the occupancy proportion corresponds to the occupancy area. In FIG. 31, the occupancy proportion corresponds to the number of image display cells CE of an enlarged image IME (hereinafter abbreviated as the number of enlarged image cells).

FIG. 31 illustrates an example of a case where images IM of two groups respectively having attributes X and Y are present in the album page 14, the number of enlarged image cells in the group having the attribute X is 2, the number of enlarged image cells in the group having the attribute Y is 0, and the images IM of the group having the attribute X account for the largest occupancy proportion in the album page 14. In a case where the attributes of the deleted images IMD are those illustrated in a table 71, the extracting unit 43 extracts, as identical-attribute images IMS, the deleted images IMD whose image IDs are IM310, IM311, IM315, IM316, and IM317 and whose attributes are identical to the attribute of the group of the largest occupancy proportion.

The user 11 provides a scroll instruction to perform scroll display of the images IM arranged in the electronic album region AR on the album page 14. The group of the largest occupancy proportion in the album page 14 when the user 11 stops the scroll instruction is a group of interest that the user 11 particularly wants to arrange in the electronic album region AR. Thus, it is estimated that the deleted image IMD that the user 11 wants to return to the album page 14 is highly likely to be the deleted image IMD whose attribute is identical to that of the group of the largest occupancy proportion in the album page 14.

Thus, as a result of extracting, as an identical-attribute image IMS, a deleted image IMD whose attribute is identical to that of a group of images IM accounting for the largest occupancy proportion in the album page 14 as described above, the deleted image IMD that matches the intention of the user 11 can be displayed on the identical-attribute image list 60, and the deleted image IMD once deleted from the album page 14 can be returned to the album page 14 without much time or effort.

Figure 32:
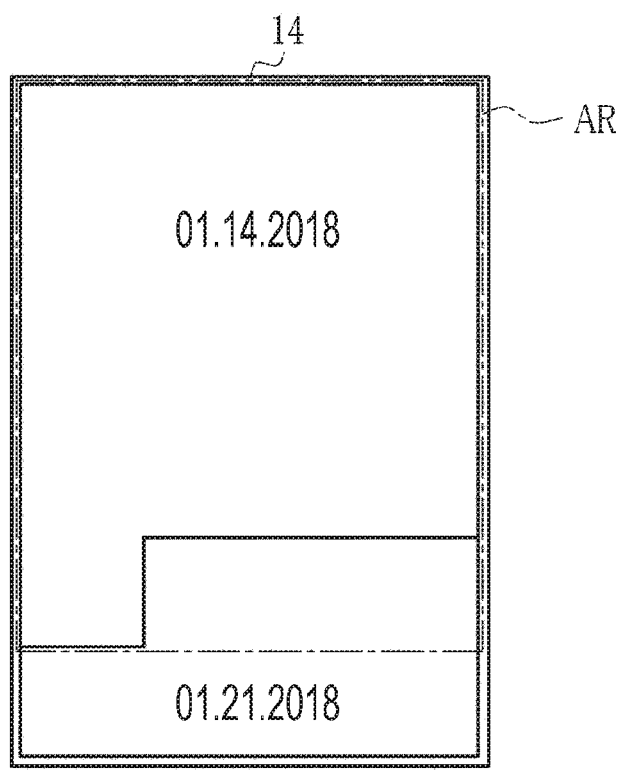
FIG. 32 is a diagram illustrating a state where images whose attributes are different from each other are present in an electronic album region.
Figure 33:
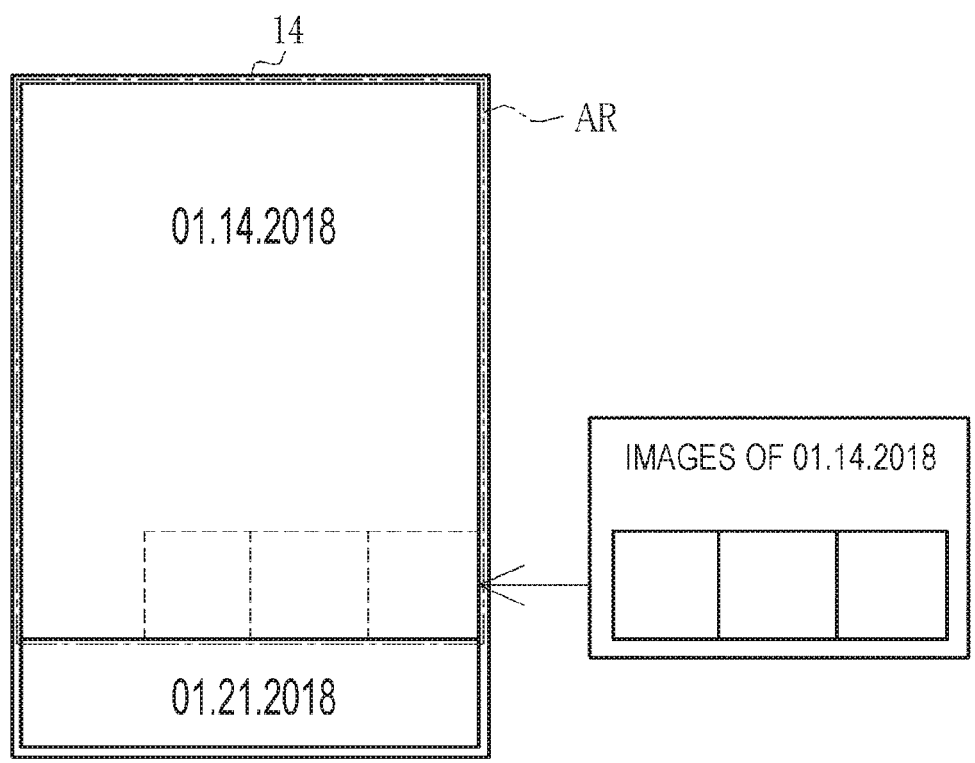
FIG. 33 is a diagram illustrating a state where images whose attributes are identical to each other are arranged in the electronic album region.

An electronic album with unity can be created by arranging the images IM having the identical attribute in the electronic album region AR as illustrated in FIG. 33 than arranging the images IM having different attributes (here, the images IM whose shooting dates are 01.14.2018 and 01.21.2018) in the electronic album region AR as illustrated in FIG. 32. Thus, in the state in FIG. 32, it is easily predicted that the user 11 will provide a return instruction to return a deleted image IMD whose attribute is identical to that of the images IM arranged in the electronic album region AR (a deleted image IMD whose shooting date is 01.14.2018). Thus, it is very effective to extract, as an identical-attribute image IMS, a deleted image IMD whose attribute is identical to that of a group of images IM accounting for the largest occupancy proportion in the album page 14.

The mode illustrated in FIG. 30 in which the occupancy area corresponds to the occupancy proportion, and the mode illustrated in FIG. 31 in which the number of enlarged image cells corresponds to the occupancy proportion, may be carried out in combination. For example, with only the mode illustrated in FIG. 30, it is not possible to select a group of the largest occupancy proportion if the occupancy areas of individual groups are equal. If the mode illustrated in FIG. 31 is carried out in combination, a group of the largest occupancy proportion is more likely to be selected.

In a case where the occupancy areas of the individual groups are equal and/or the numbers of enlarged image cells of the individual groups are equal and in a case where it is impossible to select a group of the largest occupancy proportion, a deleted image IMD whose attribute is identical to that of an image IM present in the album page 14 is extracted as an identical-attribute image IMS, as in the above-described first embodiment.

The occupancy proportion is not limited to the occupancy area illustrated in FIG. 30 or the number of enlarged image cells illustrated in FIG. 31. The occupancy proportion may simply be the number of image display cells CE.

Third Embodiment

Figure 34:
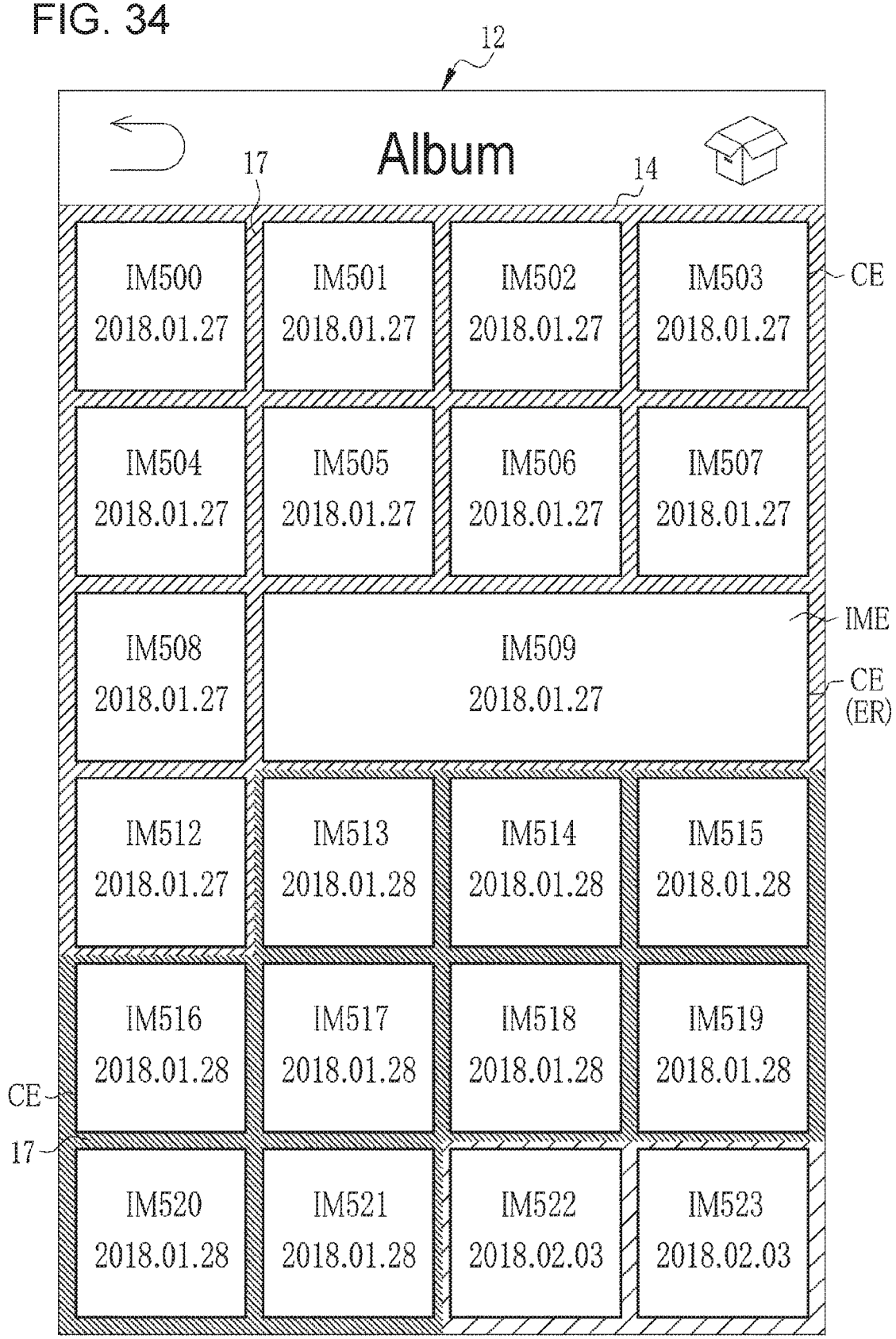
FIG. 34 is a diagram illustrating a state where images of a plurality of groups whose attributes are different from each other are present in the album page and images IM are displayed in a display format in which the groups are identifiable.

In a third embodiment illustrated in FIG. 34, in a case where images IM of a plurality of groups whose attributes are different from each other are present in the album page 14 at a current position of scroll display, the screen generating unit 40 displays the images IM in a display format in which the groups are identifiable.

FIG. 34 illustrates an example of a case where images IM whose shooting dates are 01.27.2018, 01.28.2018, and 02.03.2018 are present in the album page 14. In this case, the screen generating unit 40 changes the colors of the gaps 17 for individual groups as indicated by hatching, thereby displaying the images IM in a display format in which the groups are identifiable.

In this case where the images IM are displayed in a display format in which the groups are identifiable, the electronic album region AR can be set conveniently. The user 11 is able to easily avoid the state illustrated in FIG. 32 in which the images IM whose attributes are different from each other are present in the electronic album region AR. Instead of or in addition to changing the colors of the gaps 17 as described above, each group may be surrounded by a frame line.

As illustrated in FIG. 35A, a case is considered where the image display cell CE of an enlarged image IME as a target of undoing of an enlargement process is present in a hidden portion 50. When the undo button 15 is selected in this state, the enlarged image IME is returned to the state before the enlargement process in the hidden portion 50, as illustrated in FIG. 35B. Because the enlarged image IME is returned to the state before the enlargement process in the hidden portion 50, the user 11 is unable to determine whether or not the enlarged image IME has actually been returned to the state before the enlargement process. Thus, the user 11 needs to perform scroll display of the hidden portion 50 by providing a scroll instruction to determine whether the enlarged image IME has been returned to the state before the enlargement process.

Figure 36A:
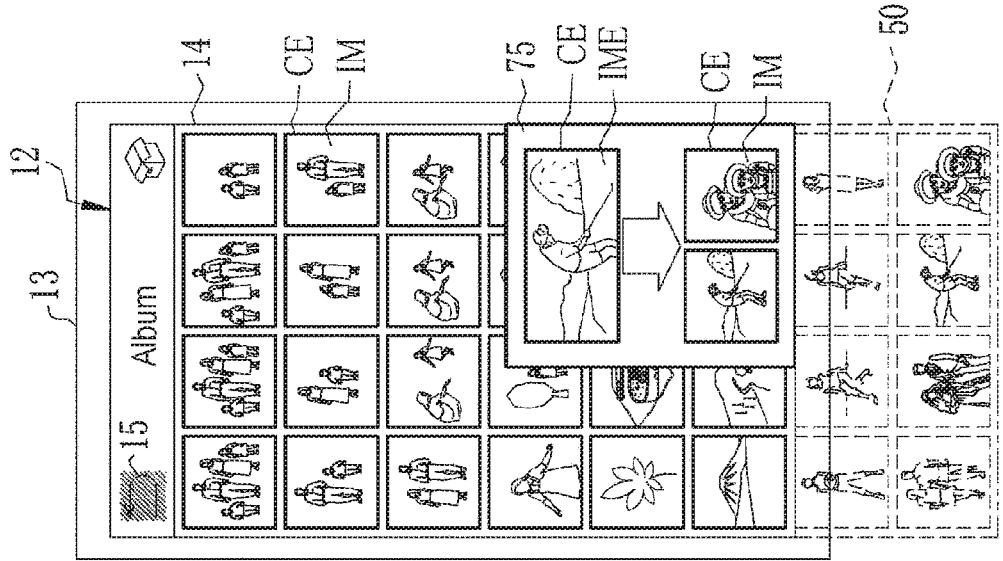
Figure 36B:
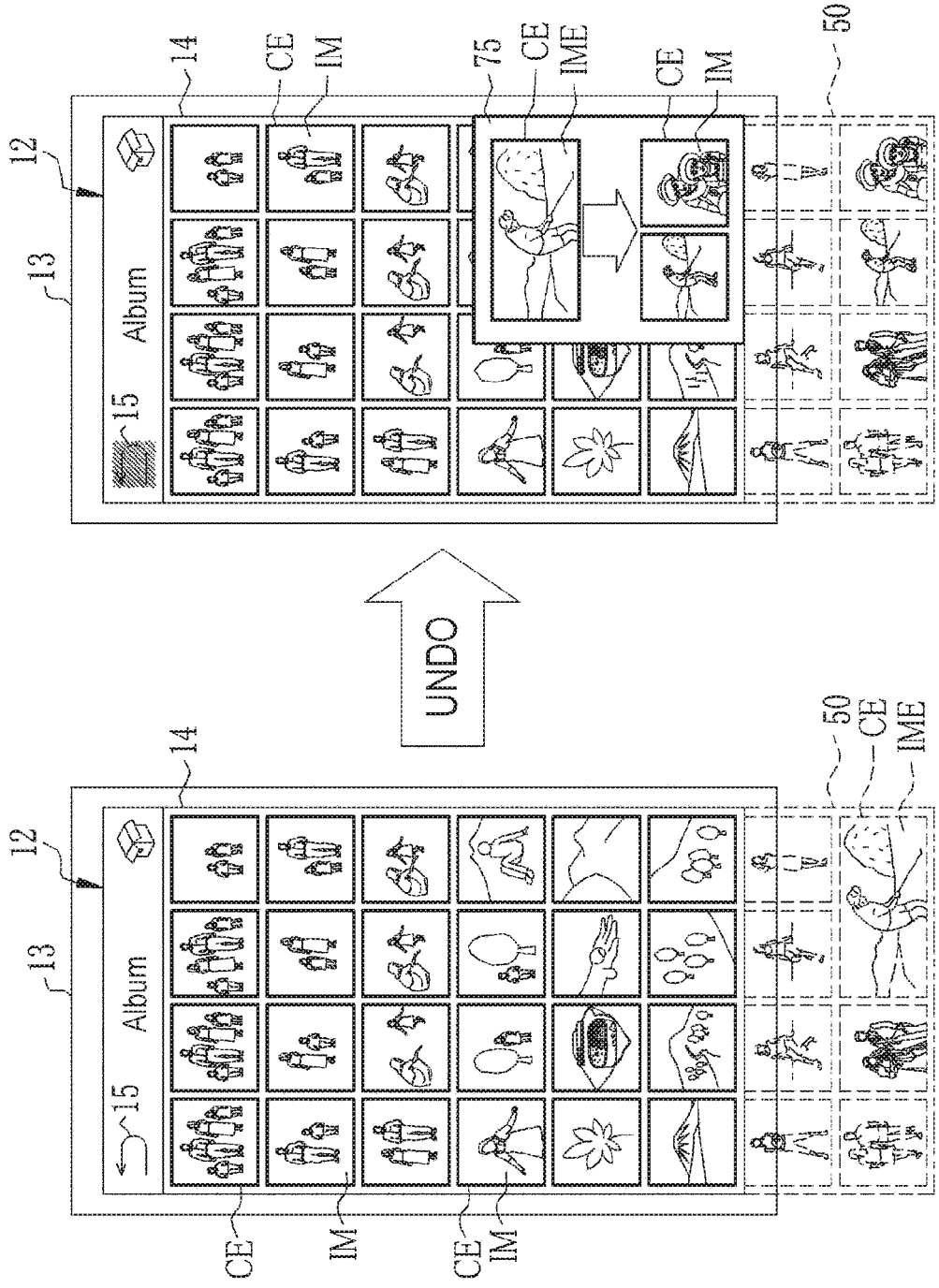

As illustrated in FIG. 36B, when the undo button 15 is selected in a state where the image display cell CE of the enlarged image IME as a target of undoing of an enlargement process is present in the hidden portion 50, the album editing unit 36 pop-up displays an undo display dialog 75 on the album screen 12. In the undo display dialog 75, the image display cell CE of the enlarged image IME as a target of undoing of an enlargement process and the image display cells CE of images IM in the state before the enlargement process are displayed with a down-pointing arrow therebetween. The undo display dialog 75 is displayed for a predetermined time period (for example, 3 seconds) and then automatically disappears.

According to the undo display dialog 75, it is obvious that the enlarged image IME has been returned to the state before the enlargement process. Thus, the user 11 does not need to perform scroll display of the hidden portion 50 by providing a scroll instruction to determine whether the enlarged image IME has been returned to the state before the enlargement process.

Figure 37:
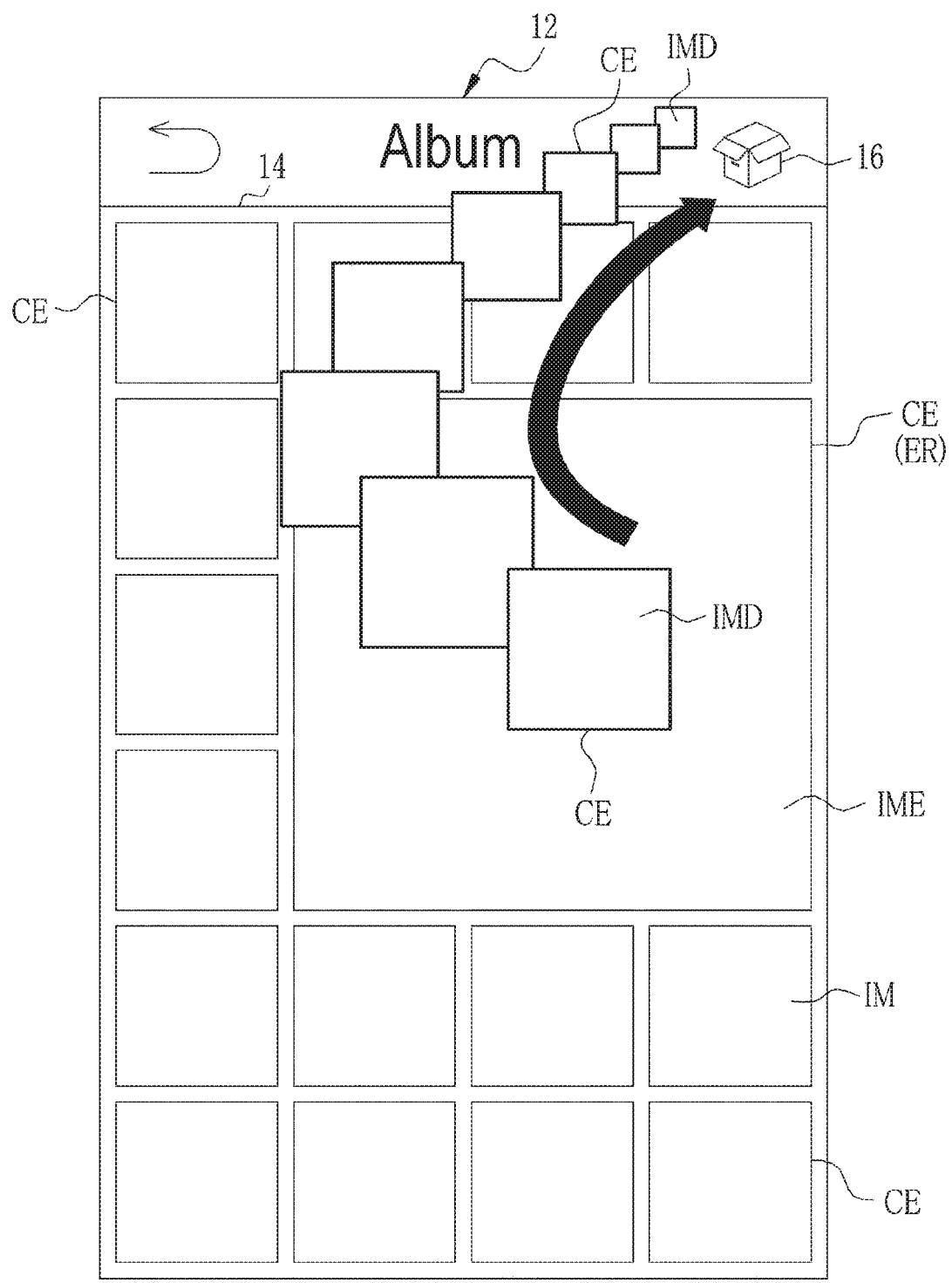
FIG. 37 is a diagram illustrating a state where animation is displayed depicting that the image display cell of a deleted image is thrown into a list display button.

As illustrated in FIG. 37, in the case of executing a deletion process to delete a deleted image IMD from the album page 14, animation may be displayed depicting that the image display cell CE of the deleted image IMD is thrown into the list display button 16 that is corrugated-box-shaped. Accordingly, it is obvious which image IM is to be deleted from the album page 14.

Instead of or in addition to a swipe instruction, a gesture instruction of touching the image display cell CE of an enlargement target image IMT with two fingers F (for example, a thumb and a forefinger) and extending the image display cell CE with the two fingers F (a pinch-out instruction) may be provided as an enlargement instruction.

Figure 38A:
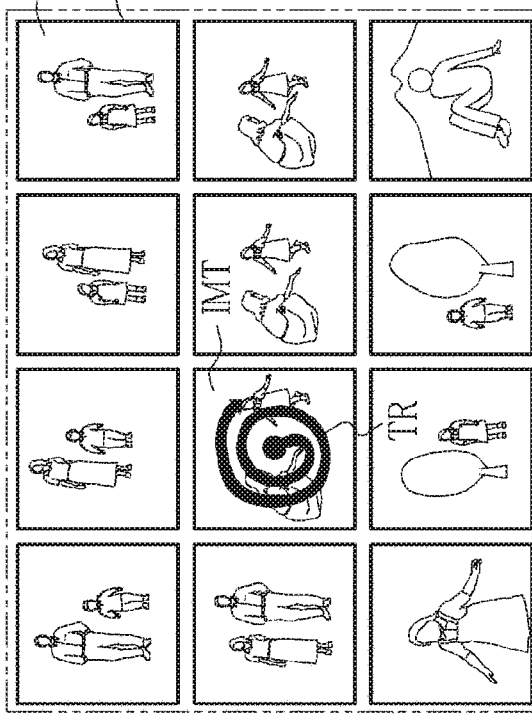

Alternatively, as indicated by a trajectory TR in FIG. 38A, a gesture instruction of touching the image display cell CE of an enlargement target image IMT with one finger F and spirally moving the finger F within the image display cell CE may be provided as an enlargement instruction, in addition to a swipe instruction. When the enlargement target image IMT is to be enlarged in the row direction, the finger F is moved so as to elongate the spiral in the row direction. When the enlargement target image IMT is to be enlarged in the column direction, the finger F is moved so as to elongate the spiral in the column direction. When the enlargement target image IMT is to be enlarged in the row direction and the column direction, the finger F is moved so as to elongate the spiral in a slanting direction.

Figure 38B:
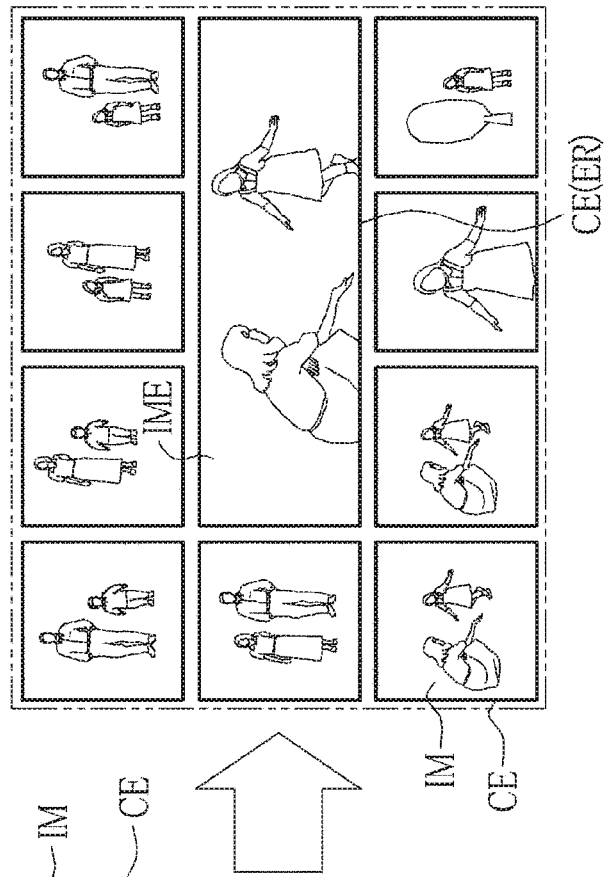

In this case, as illustrated in FIG. 38B, the images IM arranged after the enlargement target image IMT are not subjected to a deletion process, but the display positions of the image display cells CE are merely changed. That is, when the spiral gesture instruction is received, a deleted image IMD is not generated. Thus, it is not necessary to display the to-be-deleted image list in this case.

In this way, two types of enlargement instructions, the one for generating a deleted image IMD and the one for not generating a deleted image IMD, may be used. In a case where the user 11 does not intend to delete other images IM when enlarging an enlargement target image IMT, the user 11 may provide a spiral gesture instruction illustrated in FIG. 38A so as not to generate a deleted image IMD. Thus, it is possible to flexibly respond to various intentions of the user 11.

A swipe instruction with a forefinger and a swipe instruction with a thumb may be made distinguishable from each other on the basis of fingerprint recognition, a difference in the area touched with a finger, or the like. The swipe instruction with a forefinger may be defined as an instruction in which a deleted image IMD is generated, and the swipe instruction with a thumb may be defined as an instruction in which a deleted image IMD is not generated.

The unit cells UCE are not limited to square-shaped but may be rectangle-shaped. In addition, the image display cells CE may be arranged with no gaps 17 therebetween.

In each of the above-described embodiments, a selection instruction to select an enlargement target image IMT is a gesture instruction of touching the image display cell CE of the enlargement target image IMT with the finger F for a predetermined time period, but the present invention is not limited thereto. A selection instruction to select an enlargement target image IMT may be a gesture instruction of tapping once the image display cell CE of the enlargement target image IMT with the finger F (a single-tap instruction). In this case, a swipe instruction following the single-tap instruction is recognized as an enlargement instruction and is distinguished from a scroll instruction, which is a gesture instruction of flicking the inside of the album page 14 or the like in an up-down direction using the finger F.

In addition, the following method can be adopted as a selection instruction to select an enlargement target image IMT. That is, first, a dialog is displayed having an option of shifting to an enlargement process mode of enlarging a desired image IM. Subsequently, after a gesture instruction to select the option of shifting to the enlargement process mode has been provided, a gesture instruction of touching with the finger F for a predetermined time period or a swipe instruction not accompanied with a single-tap instruction is received as an enlargement instruction. In this case, the image IM in the image display cell CE touched with the finger F for the first time in the swipe instruction (the image display cell CE at the starting point of the swipe instruction) is recognized as an enlargement target image IMT.

Before shifting to the enlargement process mode (after the enlargement process mode is cancelled), a swipe instruction to the album page 14 is received as a scroll instruction, like a flick instruction. In this case, after shifting to the enlargement process mode, an enlargement instruction can be provided only by a swipe instruction without providing a gesture instruction of touching with the finger F for a predetermined time period or a single-tap instruction.

The following method may be used to distinguish an enlargement instruction and a scroll instruction from each other. That is, a scroll bar is provided at an edge portion of the album page 14 or the like. Only a gesture instruction to the scroll bar is received as a scroll instruction, and a gesture instruction to a portion in which image display cells CE are arranged outside the scroll bar is not received as a scroll instruction. In this way, a gesture instruction to the scroll bar is received as a scroll instruction, and a gesture instruction to a portion other than the scroll bar is received as an enlargement instruction or the like, and thus an enlargement instruction and a scroll instruction can be distinguished from each other. In this case, as in the case of providing the above-described enlargement process mode, a gesture instruction of touching with the finger F for a predetermined time period or a swipe instruction not accompanied with a single-tap instruction may be received as an enlargement instruction.

As illustrated in FIGS. 19A and 19B and so forth, in the case of providing a swipe instruction of linearly moving the finger F in the column direction as an enlargement instruction, the distinction from a flick instruction of flicking with the finger F in the column direction (a scroll instruction) is a particular issue. However, the enlargement instruction and the scroll instruction can be clearly distinguished from each other by using the above-described various methods.

The smartphone 10 is used as an example of the electronic album apparatus, but the present invention is not limited thereto. The electronic album apparatus may be another mobile information terminal having a touch panel, such as a tablet computer or a notebook personal computer.

A network server on the network 27 may have the functions of the electronic album apparatus. In this case, a mobile information terminal such as the smartphone 10 transmits a gesture instruction such as an enlargement instruction to the network server, and receives the screen data of the album screen 12 from the network server. The mobile information terminal reproduces the screen data of the album screen 12 and displays the screen data on a web browser, for example.

The mobile information terminal has limited resources, whereas the network server has relatively abundant resources. Thus, if the network server has the functions of the electronic album apparatus, a remarkable increase in processing speed can be expected. Thus, as long as the environment of the network 27 has sufficient capacity, it is more preferable to cause the network server to have the functions of the electronic album apparatus than to cause the mobile information terminal to have the functions of the electronic album apparatus.

Alternatively, the mobile information terminal and the network server may be caused to share the functions of the electronic album apparatus. For example, the mobile information terminal may be caused to have the functions of the instruction receiving unit 35, the extracting unit 43, and the list display processing unit 44, and the network server may be caused to have the functions of the screen generating unit 40, the scroll display processing unit 41, and the return processing unit 42.

Also, the image storage unit 32 need not necessarily be disposed in the storage device of the electronic album apparatus, and may be disposed in an image storage server on the network 27. In this case, the album editing unit 36 accesses the image storage server via the network 27 and reads out an image IM from the image storage unit 32 in the image storage server.

In this way, the hardware configuration of the computer system can be appropriately changed in accordance with required performance, such as processing capacity, safety, reliability, or the like. Furthermore, not only the hardware configuration but also various applications such as the electronic album application 30 can of course be doubled or can be stored in a plurality of storage devices in a distributed manner for the purpose of ensuring safety or reliability.

In each of the above-described embodiments, the hardware structure of a processing unit that executes various processes, such as the instruction receiving unit 35, the album editing unit 36, the screen generating unit 40, the scroll display processing unit 41, the return processing unit 42, the extracting unit 43, and the list display processing unit 44 is, for example, the CPU 22 which is a general-purpose processor that executes software (the electronic album application 30) and functions as various processing units, as described above.

Instead of all or some of the functions implemented by the CPU 22, the following various processors may be used. The various processors include, for example, a programmable logic device (PLD), which is a processor whose circuit configuration is changeable after manufacturing, such as a field programmable gate array (FPGA); a dedicated electric circuit, which is a processor having a circuit configuration designed specifically for executing specific processing, such as an application specific integrated circuit (ASIC); and the like. The hardware structure of these various processors is, more specifically, electric circuitry including a combination of circuit elements, such as semiconductor elements.

From the description given above, the invention described in the following appendix can be grasped.

Appendix 1

An electronic album apparatus including:

a screen generating processor that generates an album screen to be displayed on a touch panel display, the album screen including an album page in which a plurality of images are arranged;

an instruction receiving processor that receives a gesture instruction to the touch panel display, the instruction receiving processor receiving, as the gesture instruction, a scroll instruction for the album page and a return instruction to return a deleted image to the album page, the deleted image being an image deleted from the album page; and an album editing processor that executes an album editing process including a scroll display process of performing scroll display of the album page in response to the scroll instruction and a return process of returning the deleted image to the album page in response to the return instruction, the album editing processor executing, as the album editing process, an extraction process of extracting, from among a plurality of the deleted images, an identical-attribute image which is the deleted image whose attribute is identical to an attribute of one of the plurality of images present in the album page at a current position of the scroll display, and a list display process of displaying, together with the album page, a list of the identical-attribute image that has been extracted.

The above-described various embodiments and various modification examples can be combined as appropriate. The present invention includes, in addition to a program, a storage medium storing the program.

REFERENCE SIGNS LIST 10 smartphone
11 user
12 album screen
13 touch panel display (touch panel)
14 album page
15 undo button
16 list display button
17 gap
20 storage device
21 memory
22 CPU
23 communication unit
24 data bus
25 display
26 touch pad
27 network
30 electronic album application (electronic album application program)
31 album management information
32 image storage unit
35 instruction receiving unit
36 album editing unit
40 screen generating unit
41 scroll display processing unit
42 return processing unit
43 extracting unit
44 list display processing unit
45 trimming position adjustment screen
46 cancel button
47 check button
50 hidden portion
60 identical-attribute image list
65, 66, 70, 71 table
75 undo display dialog
IM image
IMT enlargement target image
IME enlarged image
IMD deleted image
IMS identical-attribute image
CE image display cell
UCE unit cell
F finger
TR trajectory
ER enlargement region
AR electronic album region
ST1 to ST4, ST10 to ST40, ST100 to ST160, ST130-1 to ST130-4, ST140-1 to ST140-step

What is claimed is:

1. An electronic album apparatus comprising:
a processor configured to function as:
a screen generating unit that generates an album screen to be displayed on a touch panel display, the album screen including an album page in which a plurality of images are arranged;
an instruction receiving unit that receives a gesture instruction to the touch panel display, the instruction receiving unit receiving, as the gesture instruction, a scroll instruction for the album page and a return instruction to return a deleted image to the album page, the deleted image being an image deleted from the album page; and an album editing unit that executes an album editing process including a scroll display process of performing scroll display of the album page in response to the scroll instruction and a return process of returning the deleted image to the album page in response to the return instruction, the album editing unit executing, as the album editing process, an extraction process of extracting, from among a plurality of the deleted images, an identical-attribute image which is the deleted image whose attribute is identical to an attribute of one of the plurality of images present in the album page at a current position of the scroll display, and a list display process of displaying, together with the album page, a list of the identical-attribute image that has been extracted.

2. The electronic album apparatus according to claim 1, wherein the album editing unit arranges the plurality of images in the album page in accordance with a display order that is based on the attribute.

3. The electronic album apparatus according to claim 2, wherein in a case where the plurality of images present in the album page at the current position of the scroll display are images of a plurality of groups whose attributes are different from each other, the album editing unit extracts, as the identical-attribute image, the deleted image whose attribute is identical to the attribute of a group of images accounting for a largest occupancy proportion in the album page among the plurality of groups.

4. The electronic album apparatus according to claim 2, wherein in a case where the plurality of images present in the album page at the current position of the scroll display are images of a plurality of groups whose attributes are different from each other, the screen generating unit displays the images in a display format in which the plurality of groups are identifiable.

5. The electronic album apparatus according to claim 1, wherein
the instruction receiving unit receives, as the gesture instruction, a display instruction and a hiding instruction for the list, and
the album editing unit executes the list display process in response to the display instruction and executes a list hiding process of hiding the list in response to the hiding instruction.

6. The electronic album apparatus according to claim 1, wherein the attribute is based on at least any one of an image quality of the image, a photographic subject of the image, a shooting date and time of the image, or a shooting location of the image.

7. The electronic album apparatus according to claim 1, wherein the screen generating unit generates the album page in which image display cells are arranged in a grid pattern on the basis of a unit cell whose size is defined in advance, the image display cells displaying the plurality of images, each image display cell having a size that is changed to a positive integral multiple of the unit cell.

8. The electronic album apparatus according to claim 1, wherein
the instruction receiving unit receives, as the gesture instruction, an enlargement instruction to display an image among the plurality of images in an enlarged view within the album page,
the album editing unit executes, as the album editing process, a recognition process of recognizing an enlargement target image that is the image for which the enlargement instruction has been provided, an enlargement process of enlarging the enlargement target image recognized in the recognition process, and a deletion process of deleting one or more images among the plurality of images from the album page, the one or more images being different from the enlargement target image and overlapping an enlargement region which is a region of the enlargement target image that has been enlarged, and
the one or more images that have undergone the deletion process are handled as the deleted images.

9. The electronic album apparatus according to claim 7, wherein
the instruction receiving unit receives, as the gesture instruction, an enlargement instruction to display an image among the plurality of images in an enlarged view within the album page,
the album editing unit executes, as the album editing process, a recognition process of recognizing an enlargement target image that is the image for which the enlargement instruction has been provided, an enlargement process of enlarging the enlargement target image recognized in the recognition process, and a deletion process of deleting one or more images among the plurality of images from the album page, the one or more images being different from the enlargement target image and overlapping an enlargement region which is a region of the enlargement target image that has been enlarged, and
the one or more images that have undergone the deletion process are handled as the deleted images.

10. The electronic album apparatus according to claim 9, wherein the enlargement region is a region having a size that is a positive integral multiple of the unit cell.

11. The electronic album apparatus according to claim 8, wherein the instruction receiving unit receives, as the enlargement instruction, a swipe instruction of moving one finger along the enlargement region within the album page starting from the enlargement target image.

12. An operation method for an electronic album apparatus, comprising:
a screen generation step of generating an album screen to be displayed on a touch panel display, the album screen including an album page in which a plurality of images are arranged;
an instruction reception step of receiving a gesture instruction to the touch panel display, the instruction reception step receiving, as the gesture instruction, a scroll instruction for the album page and a return instruction to return a deleted image to the album page, the deleted image being an image deleted from the album page; and
an album editing step of executing an album editing process including a scroll display process of performing scroll display of the album page in response to the scroll instruction and a return process of returning the deleted image to the album page in response to the return instruction, the album editing step executing, as the album editing process, an extraction process of extracting, from among a plurality of the deleted images, an identical-attribute image which is the deleted image whose attribute is identical to an attribute of one of the plurality of images present in the album page at a current position of the scroll display, and a list display process of displaying, together with the album page, a list of the identical-attribute image that has been extracted.

13. A non-transitory computer readable medium for storing a computer-executable program causing a computer to function as an electronic album apparatus, the computer-executable program causing a computer to execute:
  a screen generation function of generating an album screen to be displayed on a touch panel display, the album screen including an album page in which a plurality of images are arranged;
  an instruction reception function of receiving a gesture instruction to the touch panel display, the instruction reception function receiving, as the gesture instruction, a scroll instruction for the album page and a return instruction to return a deleted image to the album page, the deleted image being an image deleted from the album page; and
  an album editing function of executing an album editing process including a scroll display process of performing scroll display of the album page in response to the scroll instruction and a return process of returning the deleted image to the album page in response to the return instruction, the album editing function executing, as the album editing process, an extraction process of extracting, from among a plurality of the deleted images, an identical-attribute image which is the deleted image whose attribute is identical to an attribute of one of the plurality of images present in the album page at a current position of the scroll display, and a list display process of displaying, together with the album page, a list of the identical-attribute image that has been extracted.

* * * * *